United States Patent
Ziat et al.

(10) Patent No.: US 10,346,848 B2
(45) Date of Patent: Jul. 9, 2019

(54) PROVISIONING MULTIPLE SECURE CREDENTIALS ON AN ELECTRONIC DEVICE

(71) Applicant: Apple Inc., Cupertino, CA (US)

(72) Inventors: Mehdi Ziat, Seattle, WA (US); Vamshi Krishna Aileni, Cupertino, CA (US); Yousuf H. Vaid, Sunnyvale, CA (US); Ahmer A. Khan, Cupertino, CA (US); George R. Dicker, Sunnyvale, CA (US); Christopher Sharp, Sunnyvale, CA (US); Zachary A. Rosen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 484 days.

(21) Appl. No.: 15/175,723

(22) Filed: Jun. 7, 2016

(65) Prior Publication Data
US 2016/0358172 A1 Dec. 8, 2016

Related U.S. Application Data

(60) Provisional application No. 62/172,178, filed on Jun. 7, 2015.

(51) Int. Cl.
| | | |
|---|---|---|
| H04L 29/06 | (2006.01) |
| G06F 17/30 | (2006.01) |
| G06F 15/16 | (2006.01) |
| G06F 7/04 | (2006.01) |
| G06Q 20/40 | (2012.01) |
| G06Q 20/38 | (2012.01) |
| G06Q 20/32 | (2012.01) |
| G06Q 20/22 | (2012.01) |
| G06Q 20/34 | (2012.01) |
| G06Q 20/36 | (2012.01) |

(52) U.S. Cl.
CPC ........ *G06Q 20/409* (2013.01); *G06Q 20/227* (2013.01); *G06Q 20/32* (2013.01); *G06Q 20/3227* (2013.01); *G06Q 20/3278* (2013.01); *G06Q 20/357* (2013.01); *G06Q 20/36* (2013.01); *G06Q 20/385* (2013.01); *G06Q 20/3821* (2013.01); *H04L 63/062* (2013.01); *H04L 2463/102* (2013.01)

(58) Field of Classification Search
CPC ..... G06Q 20/409; G06Q 20/227; G06Q 20/32
USPC .......................................................... 726/5
See application file for complete search history.

(56) References Cited

U.S. PATENT DOCUMENTS

| 8,646,059 B1 | 2/2014 | von Behren et al. |
| 2014/0101042 A1 | 4/2014 | Grissom et al. |
| 2015/0019418 A1* | 1/2015 | Hotard ............... G06Q 20/36 705/41 |

(Continued)

OTHER PUBLICATIONS

Omkar Ghag; A Comprehensive Study of Google Wallet as an NFC Application; International Journal of Computer Applications (0975-8887) vol. 58—No. 16, Nov. 2012; p. 37-41.*

(Continued)

*Primary Examiner* — Monjur Rahim
(74) *Attorney, Agent, or Firm* — Van Court & Aldridge LLP

(57) ABSTRACT

Systems, methods, and computer-readable media for provisioning multiple credentials of a multi-scheme card on an electronic device for selective use in a secure transaction are provided.

20 Claims, 11 Drawing Sheets

(56) References Cited

U.S. PATENT DOCUMENTS

2015/0058191 A1 2/2015 Khan et al.
2015/0178723 A1 6/2015 Khan et al.

OTHER PUBLICATIONS

"GlobalPlatform Card, UICC Configuration, Version 1.0.1, Member Release." GlobalPlatform, Inc., Jan. 2011, 50 pages.
"GlobalPlatform Card, Mapping Guidelines of Existing GP v2.1.1, Implementation on v2.2.1, Version 1.0.1, Member Release." GlobalPlatform, Inc., Jan. 2011, 87 pages.
"Security of Proximity Mobile Payments." Smart Card Allilance, May 2009, 39 pages.
GlobalPlatform Card Technology; Contactless Services; Card Specification v2.2—Amendment C; Version 1.1.1; Jul. 2014; 126 pages.

* cited by examiner

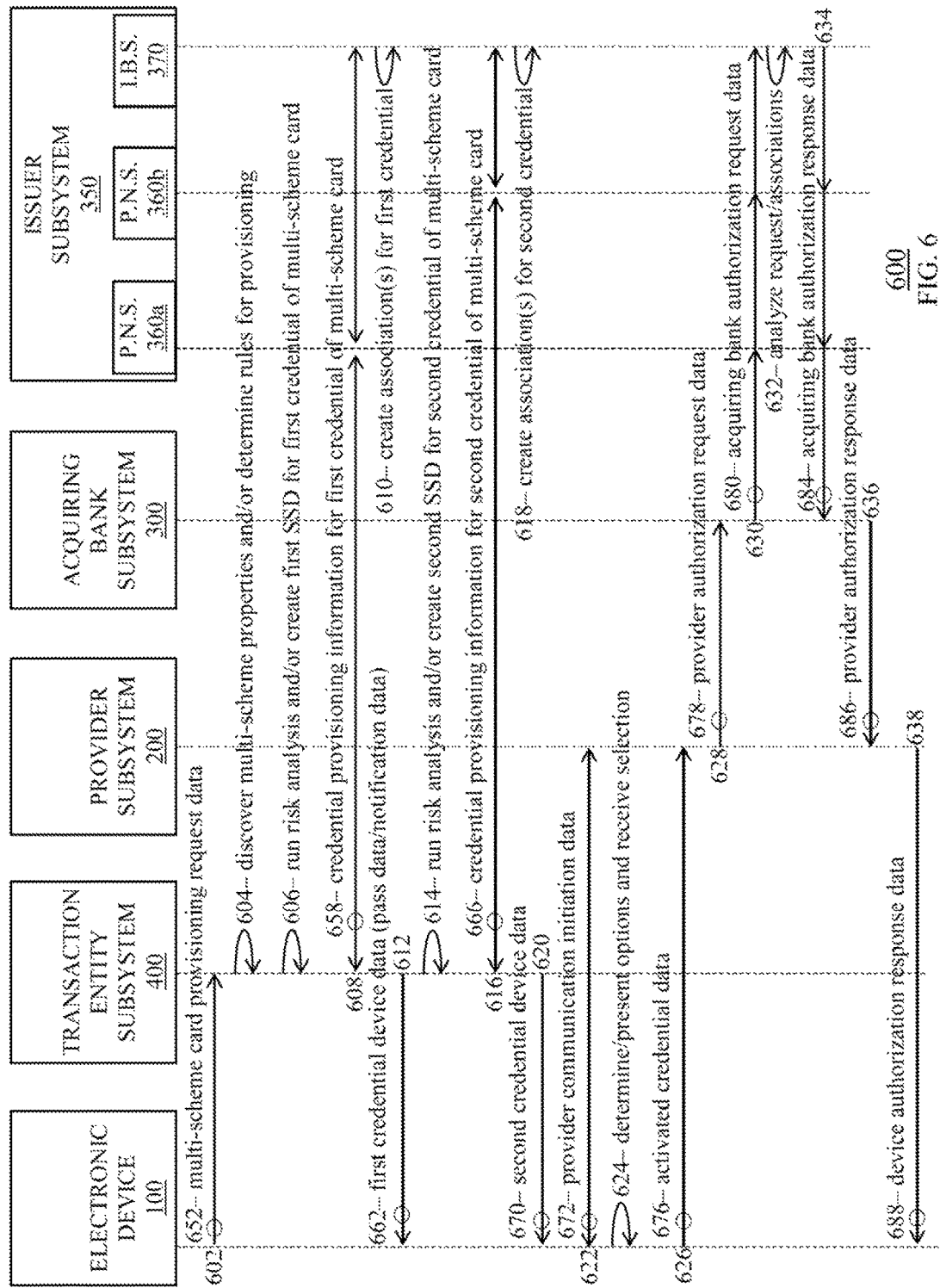

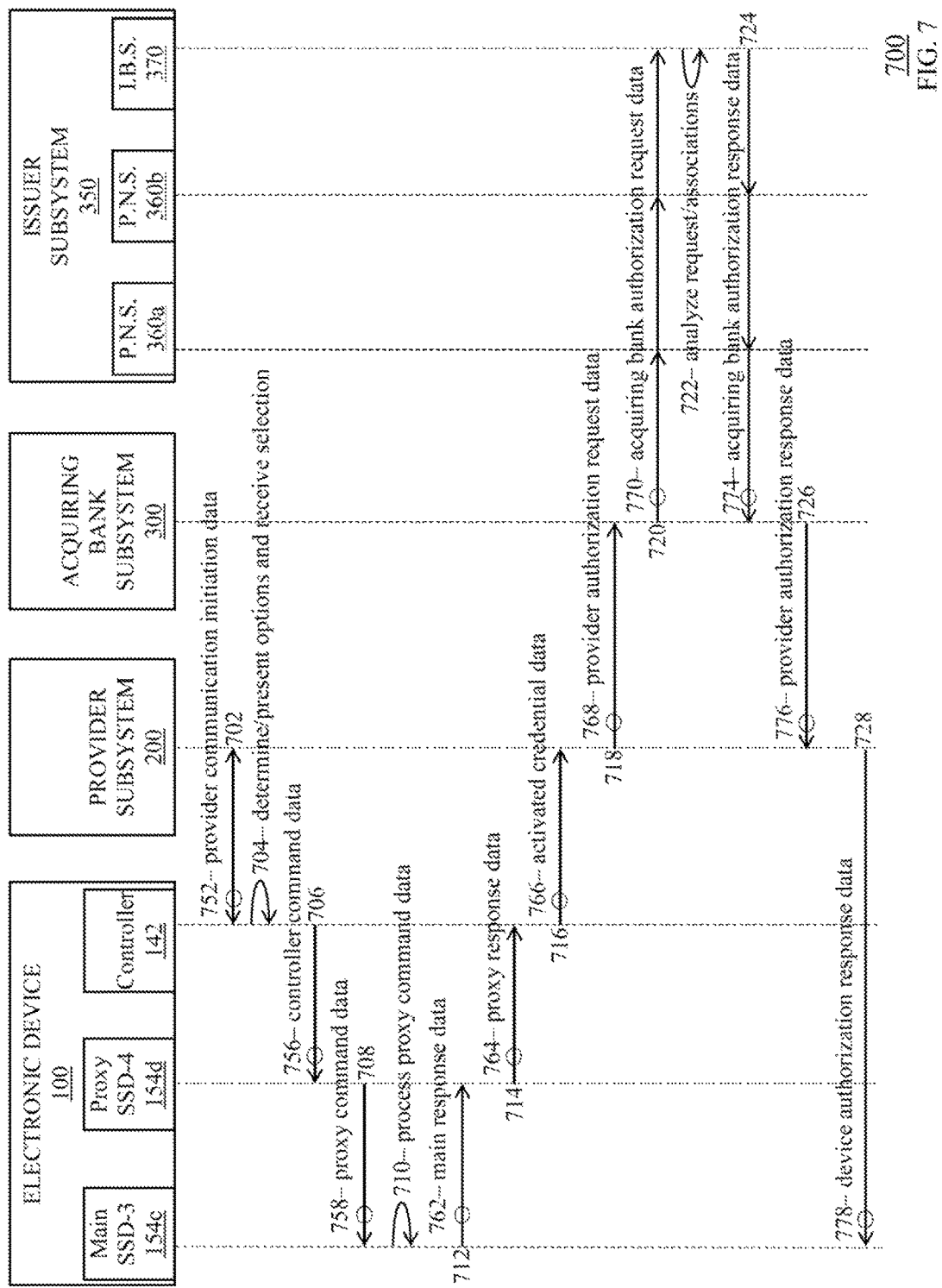

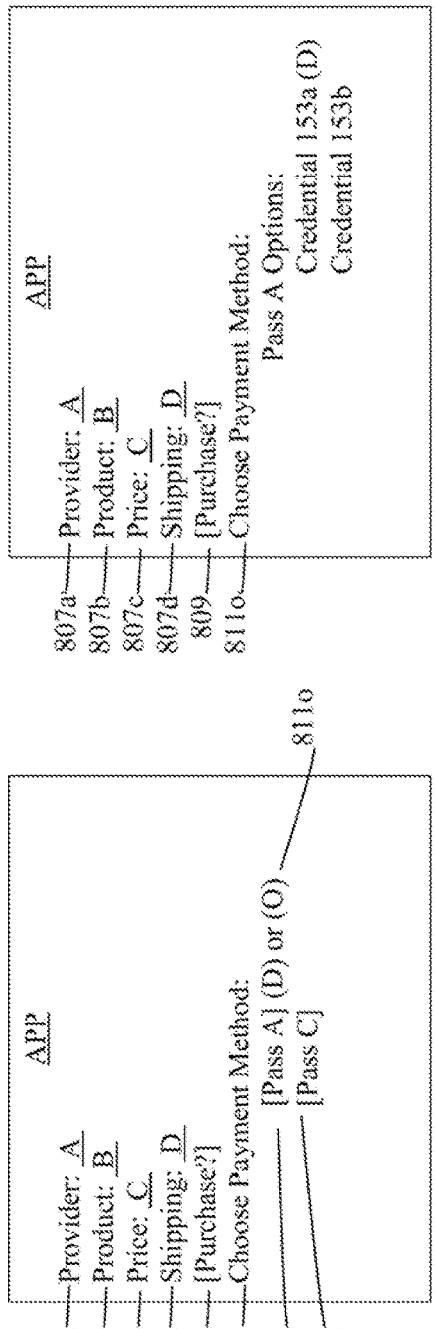
FIG. 8A
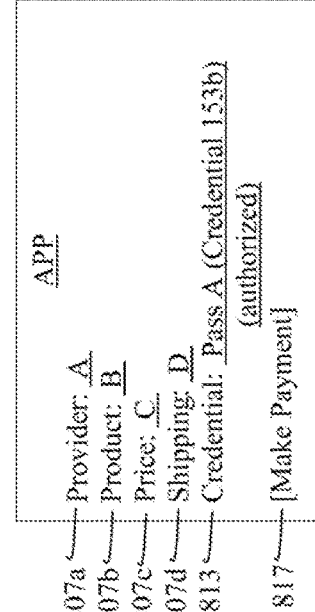
FIG. 8B
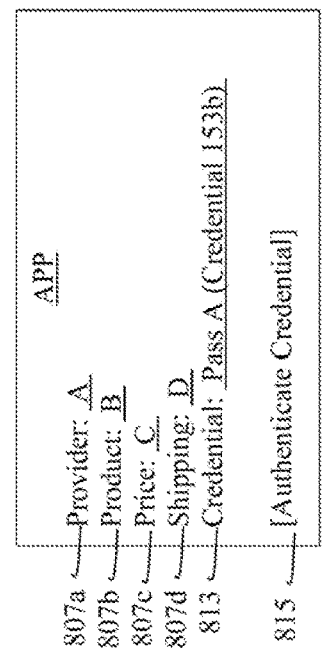
FIG. 8C
FIG. 8D

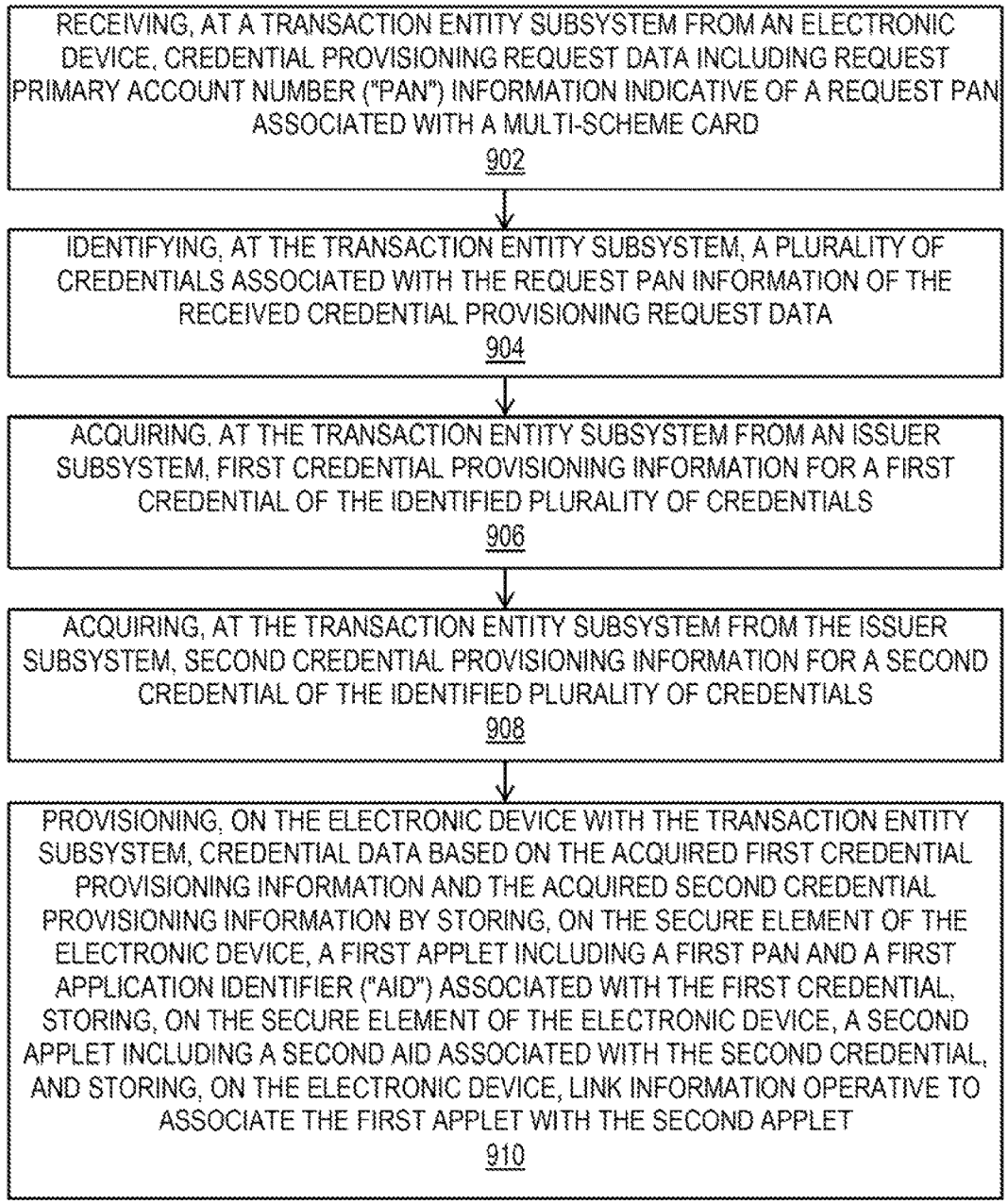

PROVISIONING MULTIPLE SECURE CREDENTIALS ON AN ELECTRONIC DEVICE

CROSS-REFERENCE TO RELATED APPLICATION(S)

This application claims the benefit of prior filed U.S. Provisional Patent Application No. 62/172,178, filed Jun. 7, 2015, which is hereby incorporated by reference herein in its entirety.

TECHNICAL FIELD

This disclosure relates to the provisioning of multiple secure credentials on an electronic device for selective use.

BACKGROUND OF THE DISCLOSURE

Portable electronic devices (e.g., cellular telephones) may be provided with near field communication ("NFC") components for enabling contactless proximity-based communications with another entity. Often times, these communications are associated with secure data transactions that require the electronic device to access and share a credential with the other entity in a contactless proximity-based communication. However, selection between multiple available credentials and use of a selected credential by the electronic device for a transaction have often been inefficient.

SUMMARY OF THE DISCLOSURE

This document describes systems, methods, and computer-readable media for provisioning multiple credentials on an electronic device for selective use in a secure transaction.

As an example, a method for providing a multi-scheme card on an electronic device including a secure element using a transaction entity subsystem and an issuer subsystem may include receiving, at the transaction entity subsystem from the electronic device, credential provisioning request data including request primary account number ("PAN") information indicative of a request PAN associated with the multi-scheme card, identifying, at the transaction entity subsystem, a plurality of credentials associated with the request PAN information of the received credential provisioning request data, acquiring, at the transaction entity subsystem from the issuer subsystem, first credential provisioning information for a first credential of the identified plurality of credentials, acquiring, at the transaction entity subsystem from the issuer subsystem, second credential provisioning information for a second credential of the identified plurality of credentials, and provisioning, on the electronic device from the transaction entity subsystem, credential data based on the acquired first credential provisioning information and the acquired second credential provisioning information, wherein the provisioning the credential data includes storing, on the secure element of the electronic device, a first applet including a first PAN and a first application identifier ("AID") associated with the first credential, storing, on the secure element of the electronic device, a second applet including a second AID associated with the second credential, and storing, on the electronic device, link information operative to associate the first applet with the second applet.

As another example, a method for providing a multi-scheme card on an electronic device including a secure element using a transaction entity subsystem, may include transmitting, to the transaction entity subsystem from the electronic device, credential provisioning request data including request primary account number ("PAN") information indicative of a request PAN of a multi-scheme card, receiving, at the electronic device from the transaction entity subsystem, credential data for a plurality of credentials associated with the request PAN information of the transmitted credential provisioning request data, storing, on the secure element, a first applet including a first application identifier ("AID") of the credential data that is associated with a first credential of the plurality of credentials, and a first PAN of the credential data, storing, on the secure element, a second applet including a second AID of the credential data that is associated with a second credential of the plurality of credentials, and storing, on the electronic device, link information of the credential data that associates the first applet with the second applet.

As yet another example, an electronic device may include pass data representative of a multi-scheme card for a first credential and a second credential, a secure element including a first applet including a first application identifier ("AID") and a first primary account number ("PAN") associated with the first credential, and a second applet including a second AID associated with the second credential, link information operative to associate the pass data to the first applet and the second applet, and at least one processor operative to select the multi-scheme card of the pass data for use in a transaction with a provider subsystem based on the link information, obtain activated credential data based on the selection, and communicate the activated credential data to the provider subsystem, wherein the activated credential data includes the first PAN and the second AID.

As yet another example, a non-transitory computer-readable storage medium may store at least one program, the at least one program including instructions, which when executed by an electronic device including a secure element, cause the electronic device to select a pass stored on the electronic device for use in a transaction between the electronic device and a provider subsystem, obtain credential data associated with the selected pass from the secure element, wherein the credential data includes first data based on a primary account number ("PAN") stored in a first applet of the secure element and second data based on an application identifier ("AID") stored in a second applet of the secure element, and communicate the obtained credential data to the provider subsystem.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 6 and 7 are flowcharts of illustrative processes for provisioning multiple credentials on an electronic device for selective use;

FIGS. 8A-8D are front views of screens of a graphical user interface of the example electronic device of FIGS. 1-5 illustrating processes for selectively using a credential in a transaction; and FIGS. 9-11 are flowcharts of additional illustrative processes for handling credentials on an electronic device for selective use.

DETAILED DESCRIPTION OF THE DISCLOSURE

Two or more applet instances may be provisioned on a secure element of an electronic device for representing different schemes of a single card. Link information may be provisioned on the electronic device in conjunction with the multiple applets in order to link the applets to one another and/or to a single pass that may be used to present information indicative of the multi-applet card to a user of the device. The link information may be configured to instruct the electronic device as to whether or not a user of the device may be enabled to choose a particular one of the multiple applets of the card. Such link information and such applet instances may be generated by a transaction entity subsystem and/or an issuer subsystem before being provisioned on the electronic device. For example, the electronic device may transmit a request to such a transaction entity subsystem, where the request may be indicative of an account number of a single physical payment card and the transaction entity subsystem may be operative to use that account number to identify two or more payment schemes that may be associated with that account number and to work with one or more issuer subsystems to provision applets for those payment schemes on the electronic device in a linked fashion. A first of the provisioned applets may be a primary or main applet while following applets may be auxiliary or proxy applets respectively linked to the main or primary applet. A proxy applet may include an application identifier but no account number, and instead may be operative to communicate directly with an associated main applet for utilizing an account number of the main applet when the proxy applet is generating credential data for use in funding an electronic transaction with a provider (or merchant) subsystem.

Figure 1:
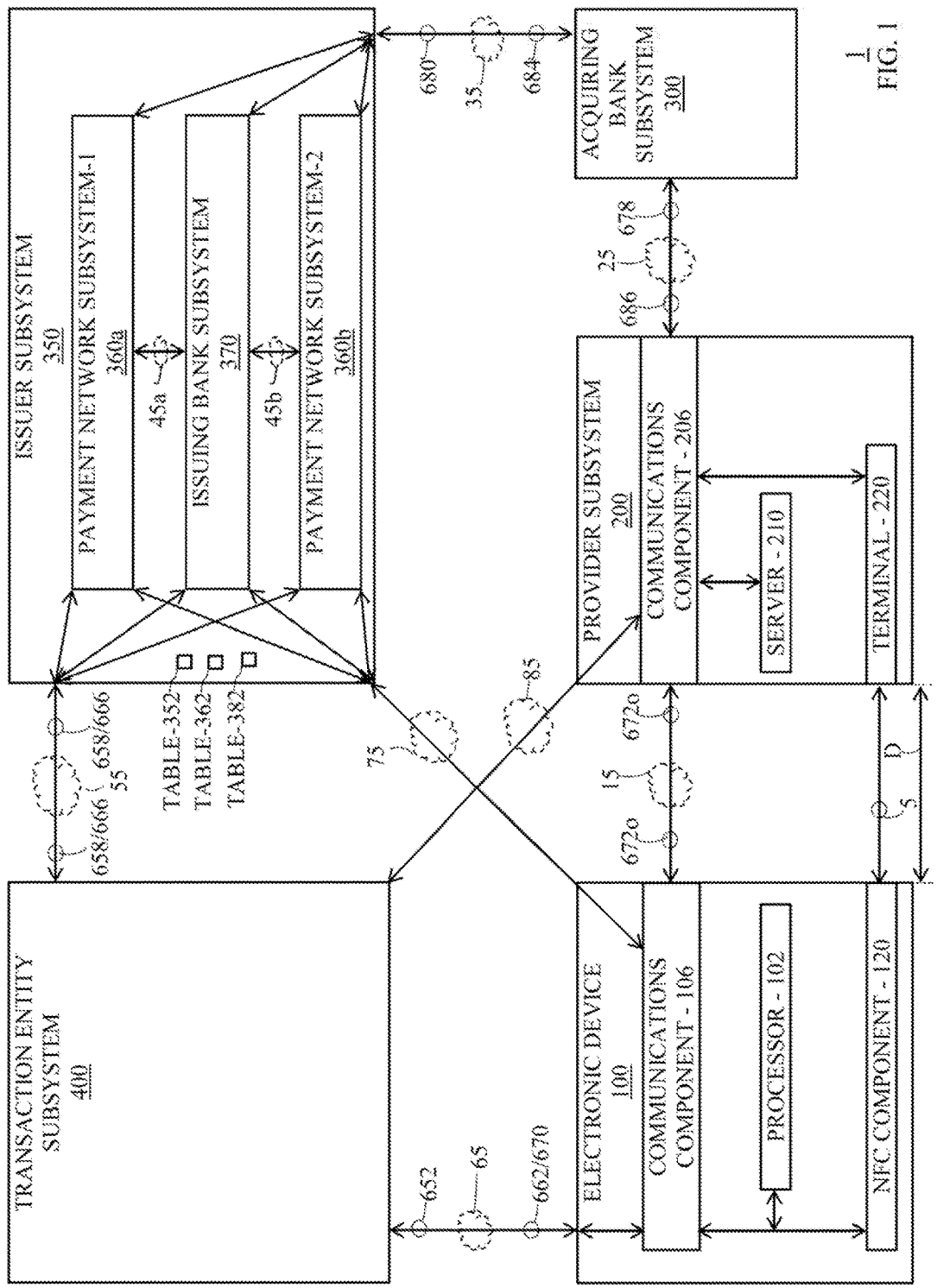
FIG. 1 is a schematic view of an illustrative system for provisioning multiple secure credentials on an electronic device for selective use.
Figure 2:
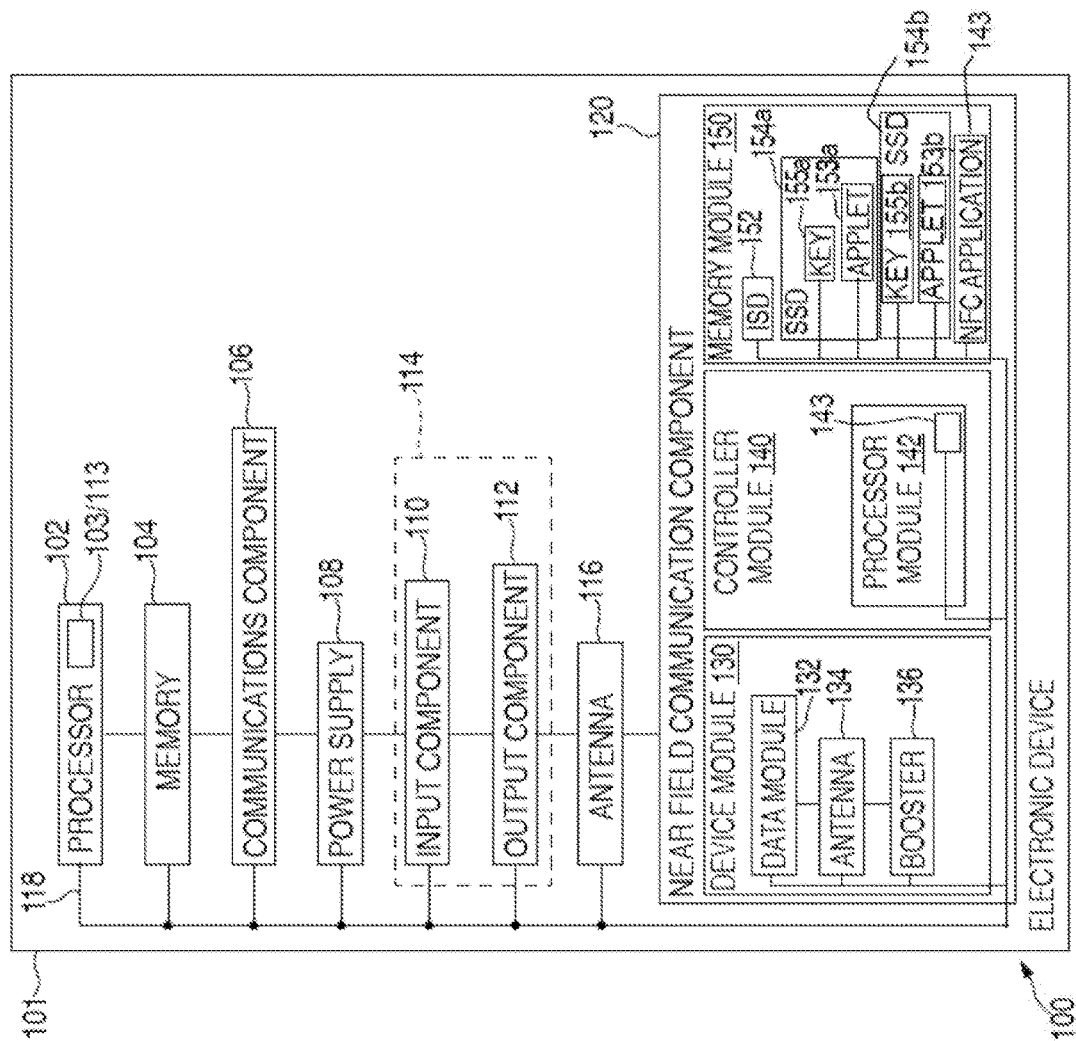
FIG. 2 is a more detailed schematic view of the example electronic device of the system of FIG. 1.
Figure 3:
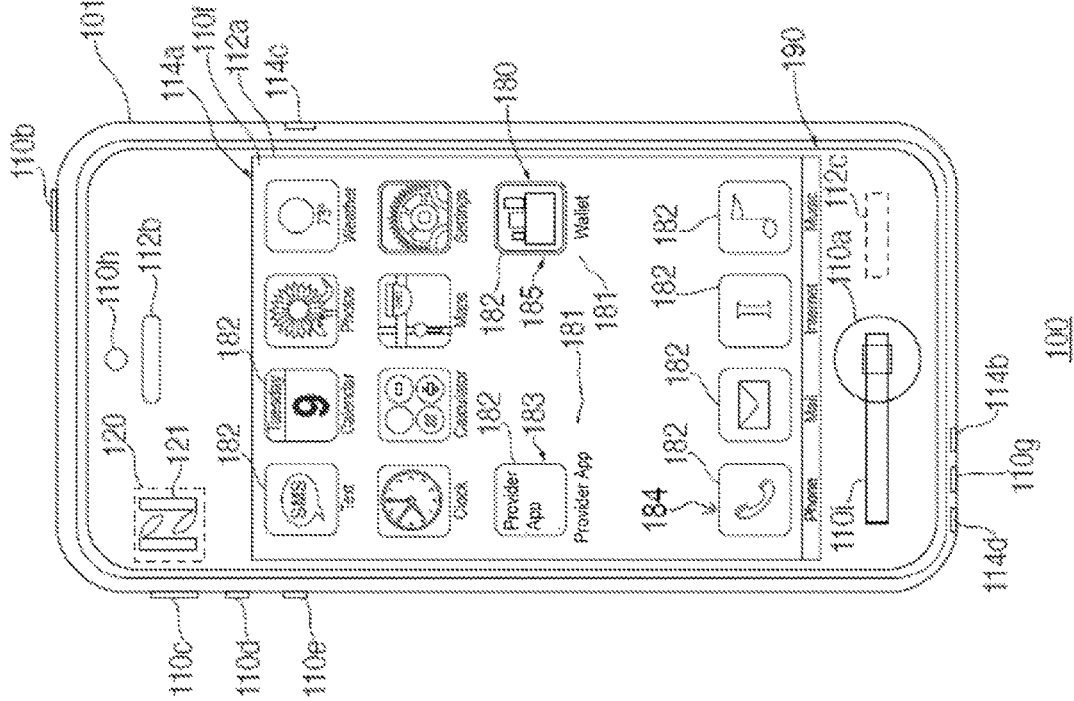
FIG. 3 is a front view of the example electronic device of FIGS. 1 and 2.
Figure 4:
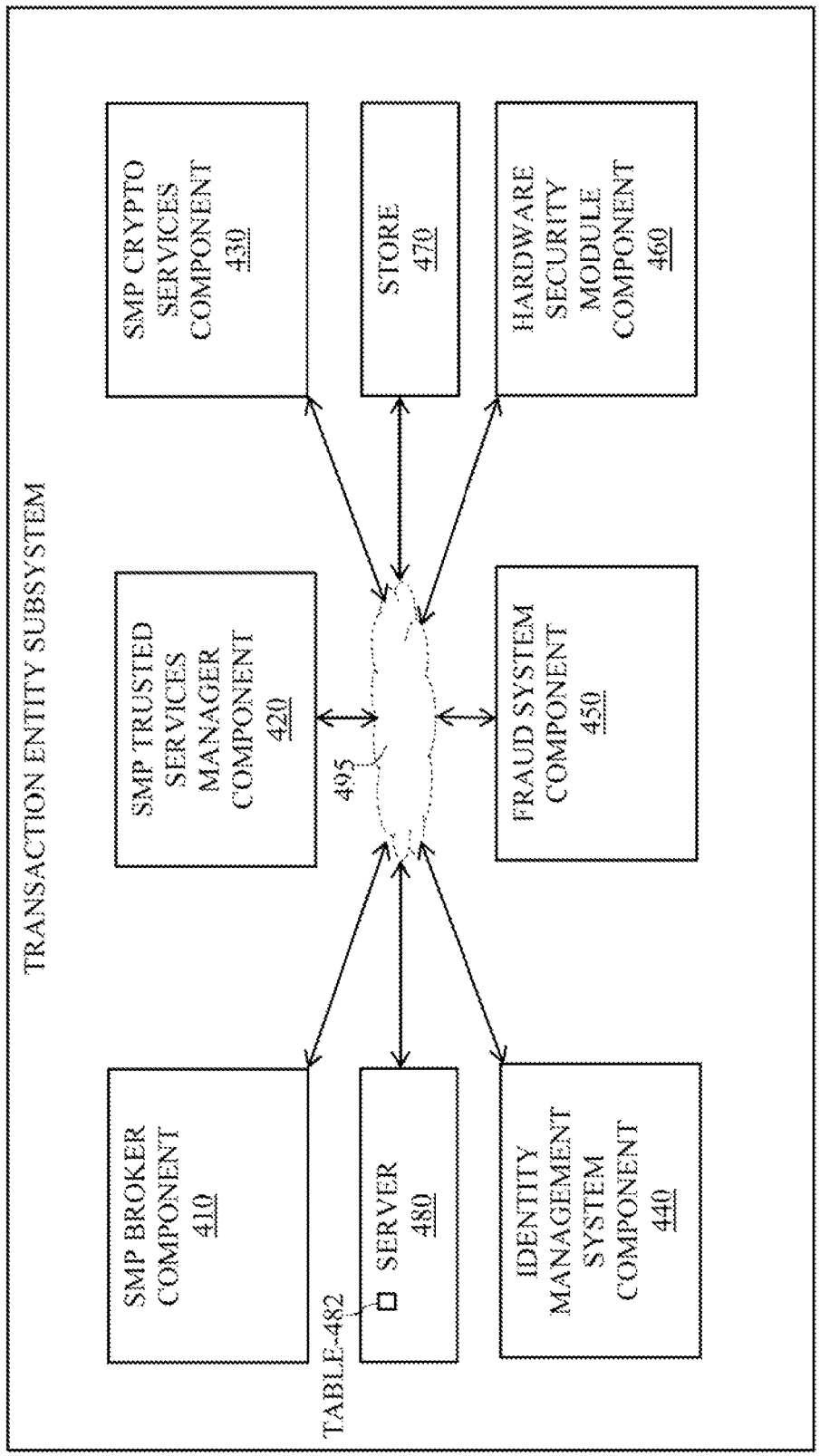
FIG. 4 is a more detailed schematic view of the example transaction entity subsystem of the system of FIG. 1.
Figure 5:
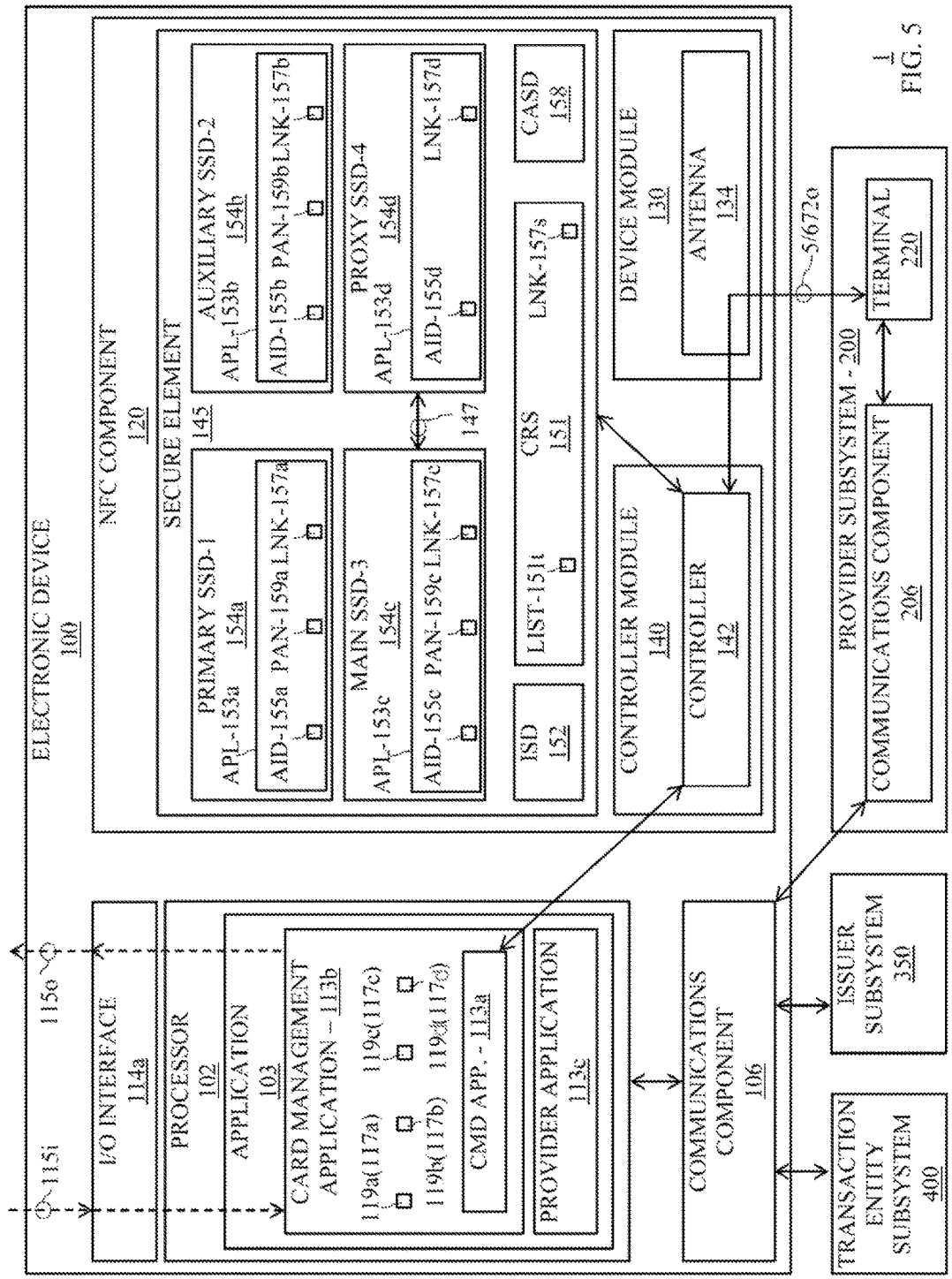
FIG. 5 is a more detailed schematic view of a portion of the system of FIG. 1.

FIG. 1 shows a system 1 in which multiple credentials of a multi-scheme payment card may be provisioned onto an electronic device 100 from an issuer subsystem 350 in conjunction with a transaction (or commercial) entity subsystem 400, and in which such credentials may be selectively used by electronic device 100 for conducting a transaction with a provider (or merchant) subsystem 200 and an associated acquiring bank subsystem 300. FIGS. 2 and 3 show further details with respect to particular embodiments of electronic device 100 of system 1, FIG. 4 shows further details with respect to particular embodiments of transaction entity subsystem 400 of system 1, FIG. 5 shows further details with respect to particular embodiments of a particular portion of system 1, FIGS. 6, 7, and 9-11 are flowcharts of illustrative processes for provisioning multiple credentials of a multi-scheme payment card on electronic device 100 and selectively using such credentials in a commercial transaction within system 1, while FIGS. 8A-8D show example screens 190a-190d that may be representative of a graphical user interface of electronic device 100 during such a conmiercial transaction.

Description of FIG. 1

FIG. 1 is a schematic view of an illustrative system 1 that may allow for the provisioning of multiple credentials of a multi-scheme payment card on an electronic device and for the selective use of such credentials in a commercial transaction. For example, as shown in FIG. 1, system 1 may include an end-user electronic device 100 as well as a transaction (or conmiercial) entity subsystem 400 and an issuer (or financial institution) subsystem 350 for securely provisioning one or more credentials on electronic device 100. Moreover, as shown in FIG. 1, system 1 may also include a provider subsystem 200 for conducting contactless proximity-based communications 5 (e.g., near field communications) and/or online-based communications 672o (e.g., in-app network telecommunications) with electronic device 100 (e.g., for enabling payments based on such provisioned credentials between a user of electronic device 100 and a provider of provider subsystem 200). System 1 may also include an acquiring bank subsystem 300 that may utilize such contactless proximity-based communications 5 and/or such online-based communications 672o for completing a financial transaction with issuer subsystem 350.

System 1 may include a communications path 15 for enabling communication between device 100 and provider subsystem 200, a communications path 25 for enabling communication between provider subsystem 200 and acquiring bank subsystem 300, a communications path 35 for enabling communication between acquiring bank subsystem 300 and issuer subsystem 350, a communications path 45a for enabling communication between a first payment network subsystem 360a of issuer subsystem 350 and an issuing bank subsystem 370 of issuer subsystem 350, a communications path 45b for enabling communication between a second payment network subsystem 360b of issuer subsystem 350 and issuing bank subsystem 370 of issuer subsystem 350, a communications path 55 for enabling communication between issuer subsystem 350 and transaction entity subsystem 400, a communications path 65 for enabling communication between transaction entity subsystem 400 and electronic device 100, a communications path 75 for enabling communication between issuer subsystem 350 and electronic device 100, and a communications path 85 for enabling communication between transaction entity subsystem 400 and provider subsystem 200. One or more of paths 15, 25, 35, 45a, 45b, 55, 65, 75, and 85 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 15, 25, 35, 45a, 45b, 55, 65, 75, and 85, which may be capable of providing communications using any suitable wired or wireless communications protocol. For example, one or more of paths 15, 25, 35, 45*a*, 45*b*, 55, 65, 75, and 85 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

As shown in FIG. 1, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., credential applets and associated credential keys) in accordance with rules and security requirements that may be set forth by a set of well-identified trusted authorities (e.g., an authority of issuer subsystem 350 and/or an industry standard, such as GlobalPlatform). As described below in more detail, a credential applet of NFC component 120 may be configured to provide sufficient detail for identifying a funding account or other financial instrument or credit source, where such a credential applet may be used by electronic device 100 in one or more communications with provider subsystem 200 for facilitating a financial transaction. NFC component 120 may be configured to communicate such credential information as a contactless proximity-based communication 5 (e.g., near field communication) with provider subsystem 200 (e.g., with a provider terminal 220 of provider subsystem 200, where provider terminal 220 may be located at a brick and mortar store or any physical location at which a user of electronic device 100 may use a credential stored on electronic device 100 to conduct a financial transaction with a proximately located provider terminal 220 via a contactless proximity-based communication 5). Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 15, 65, and/or 75). Processor 102 of electronic device 100 may include any processing circuitry that may be operative to control the operations and performance of one or more components of electronic device 100. For example, processor 102 may be configured to run one or more applications on device 100 (e.g., device application 103 or any other suitable application 113 (e.g., a card management application 113*b* and/or an online resource or provider application 113*b*)) that may at least partially dictate the way in which online-based communications 672*o* including credential information of NFC component 120 may be communicated between communications component 106 of device 100 and a provider server 210 of provider subsystem 200 (e.g., to conduct a financial transaction with a remote provider server of provider subsystem 200 over the internet or any other suitable network that may be provided by communications path 15).

Provider server 210 of provider subsystem 200 of FIG. 1 may include any suitable component or subsystem configured to receive an online-based communication 672*o* from electronic device 100 via a communication path 15 between communications component 106 of device 100 and communications component 206 of provider subsystem 200. Such an online-based communication 672*o* may be configured to communicate commerce credential data from a secure element of NFC component 120 of device 100 (e.g., credit card credential information from an enabled applet of a credential supplemental security domain ("SSD")) to server 210 via any suitable communications protocol supported by communications component 106 of electronic device 100 and communications component 206 of provider subsystem 200 (e.g., Wi-Fi, Bluetooth™, cellular, wired network protocols, etc.). Online-based communication 672*o* may be provided within any suitable online-context, such as when a user of device 100 is communicating with provider server 210 to conduct a financial transaction via a third party application running on device 100 that may be managed by provider server 210 or via an internet application or web browser (e.g., Safari™ by Apple Inc.) running on device 100 that may be pointed to a uniform resource locator ("URL") whose target or web resource may be managed by provider server 210 (e.g., provider application 113*c* of FIG. 5). Accordingly, it is noted that online-based communication 672*o* between provider server 210 and electronic device 100 may occur wirelessly and/or via wired paths (e.g., over the internet). Provider server 210 may be provided by a provider of provider subsystem 200 (e.g., as a webserver to host website data and/or manage third party application data). Although not shown, provider subsystem 200 may also include a provider processor component that may be the same as or similar to a processor component 102 of electronic device 100, a provider I/O interface that may be the same as or similar to an I/O interface 114 of electronic device 100, a provider bus that may be the same as or similar to a bus 118 of electronic device 100, a provider memory component that may be the same as or similar to a memory component 104 of electronic device 100, and/or a provider power supply component that may be the same as or similar to a power supply component 108 of electronic device 100.

Issuer subsystem 350 may include an issuing bank subsystem 370 and at least one of first payment network subsystem 360*a* and second payment network subsystem 360*b* (e.g., each of which may be any suitable payment network, such as a payment card association or a debit card association or a credit card association or the like). For example, issuing bank subsystem 370 may be an issuer (or financial institution) that may assume primary liability for a consumer's capacity to pay off debts they may incur with a specific credential. Each specific credential applet of NFC component 120 may be associated with a specific payment card that may be electronically linked to an account or accounts of a particular user. Various types of payment cards are suitable, including credit cards, debit cards, charge cards, stored-value cards, fleet cards, gift cards, loyalty cards, transit cards, and the like. The commerce credential of a specific payment card may be provisioned on electronic device 100 (e.g., as a credential of a credential supplemental security domain of NFC component 120) by issuing bank subsystem 370 for use in a commerce credential data communication (e.g., a contactless proximity-based communication 5 and/or an online-based communication 672*o*) with provider subsystem 200. Each credential may be a specific brand of payment card that may be branded by a particular payment network subsystem 360. Each one of payment network subsystems 360*a* and 360*b* may be a network of various issuing banks 370 and/or various acquiring banks that may process the use of payment cards (e.g., commerce credentials) of a specific brand.

In order for a financial transaction to occur within system 1, at least one commerce credential may be securely provisioned on a secure element of NHC component 120 of electronic device 100. For example, such a commerce credential may be at least partially provisioned on a secure element of NFC component 120 of electronic device 100 directly from issuer subsystem 350 (e.g., via communication path 75 between issuer subsystem 350 and device 100, which may be passed to NFC component 120 via communications component 106). Additionally or alternatively, such a commerce credential may be at least partially provisioned on a secure element of NFC component 120 of electronic device 100 from issuer subsystem 350 via transaction entity subsystem 400 (e.g., as credential data 658/666 via communication path 55 between issuer subsystem 350 and transaction entity subsystem 400, which may be passed to device 100 as credential data 662/670 via communication path 65 between a server or any other suitable component of transaction entity subsystem 400 and communications component 106 of device 100, which may then be passed to NFC component 120 from communications component 106). Credential data 662/670 may be provisioned on a secure element of device 100 as at least a portion or all of a credential supplemental security domain of NFC component 120 and may include a credential applet and/or a credential key.

Transaction entity subsystem 400 may be provided as an intermediary between electronic device 100 and issuer subsystem 350, where transaction entity subsystem 400 may be configured to provide a new layer of security and/or to provide a more seamless user experience when a credential is being provisioned on a secure element of device 100 and/or when such a provisioned credential is being used as part of a commerce credential data communication (e.g., as part of an online-based communication 672*o*) between device 100 and provider subsystem 200. Transaction entity subsystem 400 may be provided by a specific transaction entity that may offer various services to a user of device 100 via user-specific log-in information to a user-specific account with that transaction entity (e.g., via user-specific identification and password combinations). As just one example, transaction entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, Apple Watch™, or the like) and/or of an operating system (e.g., device application 103) of device 100. Additionally or alternatively, transaction entity subsystem 400 may be provided by a network operator (e.g., a mobile network operator, which may have a relationship with a user of device 100 (e.g., a data plan for enabling the communication of data over a certain communication path and/or using a certain communication protocol with device 100)).

The transaction entity that may provide, manage, or at least partially control transaction entity subsystem 400 may also provide different users with their own personalized accounts for using the services offered by that transaction entity. Each user account with the transaction entity may be associated with a specific personalized user ID and password that a user may use to log-in to their account with the transaction entity. Each user account with the transaction entity may also be associated with or have access to at least one commerce credential that can then be used by the user for purchasing services or products offered by the transaction entity. For example, each Apple ID user account may be associated with at least one credit card of a user associated with that Apple ID, such that the credit card may then be used by the user of that Apple ID account for procuring services from Apple's iTunes™ Store, the Apple App Store™, the Apple iCloud™ Service, and the like. The transaction entity that may provide transaction entity subsystem 400 (e.g., Apple Inc.) may be distinct and independent from any financial entity of issuer subsystem 350. For example, the transaction entity that may provide transaction entity subsystem 400 may be distinct and independent from any payment network subsystem 360 or issuing bank subsystem 370 that may furnish and manage any credit card or other commerce credential to be provisioned on user device 100. Additionally or alternatively, the transaction entity that may provide transaction entity subsystem 400 (e.g., Apple Inc.) may be distinct and independent from any provider of provider subsystem 200. For example, the transaction entity that may provide transaction entity subsystem 400 may be distinct and independent from any provider of provider subsystem 200 that may provide a provider terminal for NFC communications, and/or any other aspect of provider subsystem 200. Such a transaction entity may leverage its potential ability to configure or control various components of device 100 (e.g., software and/or hardware components of device 100 when that transaction entity at least partially produces or manages device 100) in order to provide a more seamless user experience for a user of device 100 when he or she wants to provision a credential offered by issuer subsystem 350 on user device 100 and/or when such a provisioned credential is being used as part of a commerce credential data communication with provider subsystem 200 (e.g., as part of communication 5 or communication 672*o*). For example, in some embodiments, device 100 may be configured to communicate with transaction entity subsystem 400 seamlessly and transparently to a user of device 100 (e.g., via communications path 65) for sharing or receiving certain data that may enable a higher level of security (e.g., during provisioning of one or more credentials on device 100 and/or deleting credentials from device 100 and/or during an online-based commerce credential data communication between device 100 and provider subsystem 200). Although not shown, transaction entity subsystem 400 may also include a processor component that may be the same as or similar to a processor component 102 of electronic device 100, a communications component that may be the same as or similar to a communications component 106 of electronic device 100, an I/O interface that may be the same as or similar to an I/O interface 114 of electronic device 100, a bus that may be the same as or similar to a bus 118 of electronic device 100, a memory component that may be the same as or similar to a memory component 104 of electronic device 100, and/or a power supply component that may be the same as or similar to a power supply component 108 of electronic device 100, one, some, or all of which may be at least partially provided by a server or any other suitable component of transaction entity subsystem 400, for example. Details regarding an example of how transaction entity subsystem 400 may be implemented are provided below with reference to FIG. 4.

As mentioned, in addition to at least one credential SSD being provisioned on a secure element of electronic device 100, at least one third party application (e.g., provider application 113c of FIG. 5) may be accessed by device 100 in order to enable a commerce credential data communication (e.g., communication 5 or an online-based communication 672o) between device 100 and provider subsystem 200. First, such a provider application 113c may be approved or otherwise enabled by transaction entity subsystem 400 before the application may be accessible by device 100. For example, an application store (e.g., store 470 of FIG. 4) of transaction entity subsystem 400 (e.g., the Apple App Store™) may receive at least some data representative of provider application 113c from provider subsystem 200 via communication path 85. For example, a provider of provider subsystem 200 may work with transaction entity subsystem 400 to associate a particular provider website or provider application 113c with a particular provider key, which may enable transaction entity subsystem 400 to determine and utilize an appropriate provider key for providing a layer of security to a commerce credential data communication (e.g., an online-based communication 672o) between device 100 and provider subsystem 200 (e.g., when a user of device 100 is communicating with provider server 210 to conduct a financial transaction via provider application 113c and/or an internet application or web browser running on device 100 that may be pointed to a URL whose target or web resource may be associated with that provider key). Device 100 may be configured to access such a URL, for example, from provider server 210 via communication path 15 using an internet application on device 100.

Description of FIG. 2

Referring now to FIG. 2, FIG. 2 shows further details with respect to particular embodiments of electronic device 100 of system 1. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application (e.g., an application associated with a provider of provider subsystem 200) or a device application that may be provided by a manufacturer of device 100 (e.g., a card management application).

NFC component 120 may be any suitable proximity-based communication mechanism that may enable contactless proximity-based transactions or communications 5 between electronic device 100 and provider terminal 220 (e.g., a provider payment terminal) of provider subsystem 200. NFC component 120 may include any suitable modules for enabling contactless proximity-based communication 5 between electronic device 100 and provider terminal 220. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a provider terminal as part of a contactless proximity-based or NFC communication. Additionally or alternatively, NFC data module 132 may be configured to contain, route, or otherwise receive any suitable data that may be received by NFC component 120 from a provider terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a provider terminal. NFC controller module 140 may include at least one NFC processor module 142 (e.g., an NFC controller) that may be used to run one or more applications 143, such as a routing application (e.g., implementing a routing table) that may be used by NFC processor module 142 in performing the routing of communications from provider subsystem 200 to host processor 102 and/or to NFC memory module 150 and/or therebetween), an NFC low power mode, or a wallet application, that may help dictate the function of NFC component 120, where application 143 may or may not be accessed by NFC processor module 142 from memory module 150 or any other portion of device 100 (e.g., memory 104 via processor 102). NFC memory module 150 may operate in conjunction with NFC device module 130 and/or NFC controller module 140 to allow for NFC communications between electronic device 100 and provider subsystem 200. NFC memory module 150 may be tamper resistant and may provide at least a portion of a secure element 145 (see, e.g., FIG. 5). For example, such a secure element may be configured to provide a tamper-resistant platform (e.g., as a single or multiple chip secure microcontroller) that may be capable of securely hosting applications and their confidential and cryptographic data (e.g., applets 153 and any associated keys) in accordance with rules and security requirements that may be set forth by a set of well-identified trusted authorities (e.g., an authority of issuer subsystem 350 and/or an industry standard, such as Global-Platform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing issuer (e.g., issuer subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A credential may include credential data that may be assigned to a user/consumer and that may be stored securely on electronic device 100, such as a credit card payment number (e.g., an account number). NFC memory module 150 may include at least two SSDs 154 (e.g., at least a first SSD 154a and a second SSD 154b). For example, first SSD 154a (e.g., a credential SSD 154a) may be associated with a first specific credential (e.g., a first specific credit card credential or debit card credential or specific public transit card credential provisioned by issuer subsystem 350) that may provide first specific privileges or payment rights to electronic device 100, while second SSD 154b (e.g., an access SSD 154b) may be associated with a second specific credential (e.g., a second specific credit card credential or debit card credential or public transit card credential provisioned by issuer subsystem 350) that may provide second specific privileges or payment rights to electronic device 100. Each SSD 154 may include and/or be associated with at least one applet 153 (e.g., SSD 154a with applet 153a and SSD 154b with applet 153b). For example, an applet 153 of an SSD 154 may be an application that may run on a secure element of NFC component 120 (e.g., in a GlobalPlatform environment). Each applet 153 may also include and/or be associated with at least one of its own keys.

A key of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. As one example, while credential SSD 154a may be associated with a particular credit card credential, that particular credential may only be communicated as a commerce credential data communication to provider subsystem 200 (e.g., as a contactless proximity-based communication 5 to provider terminal 220 and/or as an online-based communication 672o to a provider server 210) from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credit card information or bank account information of a credential, from electronic device 100 to provider subsystem 200. Such security features also may include a secure storage area that may have restricted access. For example, user authentication via personal identification number ("PIN") entry or via user interaction with a biometric sensor may need to be provided to access the secure storage area. As an example, an access SSD may leverage an access applet to determine whether such authentication has occurred before allowing other SSDs 154 (e.g., a credential SSD 154a) to be used for communicating its credential information. In certain embodiments, some or all of the security features may be stored within NFC memory module 150. Further, security information, such as an authentication key, for communicating commerce credential data with provider subsystem 200 may be stored within NFC memory module 150. In certain embodiments, NFC memory module 150 may include a microcontroller embedded within electronic device 100. As just one example, an access applet of an access SSD may be configured to determine intent and local authentication of a user of device 100 (e.g., via one or more input components 110, such as a biometric input component) and, in response to such a determination, may be configured to enable another particular SSD for conducting a payment transaction (e.g., with a credential of credential SSD 154a).

Description of FIG. 3

As shown in FIG. 3, and as described below in more detail, a specific example of electronic device 100 of FIGS. 1 and 2 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Provider App" textual indicator 181 (i.e., specific icon 183) is selected, device 100 may launch or otherwise access a specific third party provider application (e.g., provider application 113c of FIG. 5) and may display screens of a specific user interface that may include one or more tools or features for interacting with device 100 in a specific manner. As another example, when the specific icon 182 labeled with a "Wallet" textual indicator 181 (i.e., specific icon 185) is selected, device 100 may launch or otherwise access a specific device application (e.g., card management application 113b of FIG. 5 (e.g., as a "Wallet" or "Passbook" application) for managing various credentials on secure element 145) and may display screens of a specific user interface that may include one or more tools or features for interacting with device 100 in a specific manner. For example, FIGS. 8A-8D may show specific examples of such displays of GUI 180 during use of a provider application (e.g., application 113c) and/or a digital wallet or card management application (e.g., application 113b) that may be used by a user of device 100 for making a payment with a credential of NFC component 120 (e.g., a credential of credential SSD 154a), via a communication 5 and/or a communication 672o). For each application, screens may be displayed on display output component 112a and may include various user interface elements. Additionally or alternatively, for each application, various other types of non-visual information may be provided to a user via various other output components 112 of device 100.

Description of FIG. 4

Referring now to FIG. 4, FIG. 4 shows further details with respect to particular embodiments of transaction entity subsystem 400 of system 1. As shown in FIG. 4, transaction entity subsystem 400 may be a secure platform system and may include a secure mobile platform ("SMP") broker component 410, an SMP trusted services manager ("TSM") component 420, an SMP crypto services component 430, an identity management system ("IDMS") component 440, a fraud system component 450, a hardware security module ("HSM") component 460, a store component 470, and/or one or more servers 480. One, some, or all components of transaction entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of transaction entity subsystem 400 may be managed by, owned by, at least partially controlled by, and/or otherwise provided by a single transaction entity (e.g., Apple Inc.) that may be distinct and independent from issuer subsystem 350. The components of transaction entity subsystem 400 may interact with each other and collectively with issuer subsystem 350 and/or electronic device 100 and/or provider subsystem 200 for providing a new layer of security and/or for providing a more seamless user experience when managing credentials from issuer subsystem 350 on device 100.

SMP broker component 410 of transaction entity subsystem 400 may be configured to manage user authentication with a transaction entity user account. SMP broker component 410 may also be configured to manage the lifecycle and provisioning of credentials on device 100. SMP broker component 410 may be a primary end point that may control the user interface elements (e.g., elements of GUI 180) on device 100. An operating system or other application of device 100 (e.g., application 103, application 113, and/or application 143) may be configured to call specific application programming interfaces ("APIs") and SMP broker 410 may be configured to process requests of those APIs and respond with data that may derive the user interface of device 100 and/or respond with application protocol data units ("APDUs") that may communicate with the secure element of NFC component 120 (e.g., via a communication path 65 between transaction entity subsystem 400 and electronic device 100). Such APDUs may be received by transaction entity subsystem 400 from issuer subsystem 350 via a trusted services manager ("TSM") of system 1 (e.g., a TSM of a communication path 55 between transaction entity subsystem 400 and issuer subsystem 350). SMP TSM component 420 of transaction entity subsystem 400 may be configured to provide GlobalPlatform-based services or any other suitable services that may be used to carry out credential provisioning operations on device 100 from issuer subsystem 350. GlobalPlatform, or any other suitable secure channel protocol, may enable SMP TSM component 420 to properly communicate and/or provision sensitive account data between the secure element of device 100 and a TSM for secure data communication between transaction entity subsystem 400 and issuer subsystem 350.

SMP TSM component 420 may be configured to use HSM component 460 to protect its keys and generate new keys. SMP crypto services component 430 of transaction entity subsystem 400 may be configured to provide key management and cryptography operations that may be provided for user authentication and/or confidential data transmission between various components of system 1. SMP crypto services component 430 may utilize HSM component 460 for secure key storage and/or opaque cryptographic operations. A payment crypto service of SMP crypto services component 430 may be configured to interact with IDMS component 440 to retrieve on-file credit cards or other types of commerce credentials associated with user accounts of the transaction entity. Such a payment crypto service may be configured to be the only component of transaction entity subsystem 400 that may have clear text (i.e., non-hashed) information describing commerce credentials (e.g., credit card numbers) of its user accounts in memory. Transaction entity fraud system component 450 of transaction entity subsystem 400 may be configured to run a transaction entity fraud check on a commerce credential based on data known to the transaction entity about the commerce credential and/or the user (e.g., based on data (e.g., commerce credential information) associated with a user account with the transaction entity and/or any other suitable data that may be under the control of the transaction entity and/or any other suitable data that may not be under the control of issuer subsystem 350). Transaction entity fraud system component 450 may be configured to determine a transaction entity fraud score for the credential based on various factors or thresholds. Additionally or alternatively, transaction entity subsystem 400 may include a store 470, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, store 470 may be configured to manage and provide an application 113 to device 100 (e.g., via communications path 65), where application 113 may be any suitable application, such as a banking application, a commercial provider application, an e-mail application, a text messaging application, an internet application, a card management application, or any other suitable communication application. Any suitable communication protocol or combination of communication protocols may be used by transaction entity subsystem 400 to communicate data amongst the various components of transaction entity subsystem 400 (e.g., via at least one communications path 495 of FIG. 4) and/or to communicate data between transaction entity subsystem 400 and other components of system 1 (e.g., financial entity subsystem 350 via communications path 55 of FIG. 1 and/or electronic device 100 via communications path 65 of FIG. 1).

Description of FIG. 5

Referring now to FIG. 5, FIG. 5 shows a detailed view of a portion of system 1 described above with respect to FIG. 1. As shown in FIG. 5, for example, a secure element 145 of NFC component 120 may include a first SSD 154a that may include or be associated with a first applet 153a, a second SSD 154b that may include or be associated with a second applet 153b, a third SSD 154c that may include or be associated with a third applet 153c, and a fourth SSD 154d that may include or be associated with a fourth applet 153d. In some embodiments, at least one of specific supplemental security domains ("SSD") 154 (e.g., one or more SSDs 154a-154d) may be associated with a particular TSM and at least one specific commerce credential (e.g., a specific credit card credential or debit card credential or public transit card credential, etc.) that may provide specific privileges or payment rights to electronic device 100. One or more of SSDs 154 may have its own manager key that may need to be activated to enable a function of that SSD 154 for use by NFC device module 130. Additionally or alternatively, one or more SSDs 154 may include and/or be associated with at least one of its own credential applications or credential applets (e.g., a Java card applet instance) associated with a particular commerce credential (e.g., credential applet 153a of SSD 154a may be associated with a first commerce credential and credential applet 153b of SSD 154b may be associated with a second commerce credential), where such a credential applet may have its own access key and/or its own credential key, and/or where such a credential applet may be activated to enable its associated commerce credential for use by NFC device module 130 as an NFC communication 5 and/or as an online-based communications 672o between electronic device 100 and provider subsystem 200. In some embodiments, a credential key of a credential applet may be generated by issuer subsystem 350 that may be responsible for such a credential and may be accessible by that issuer subsystem 350 for enabling secure transmission of that credential applet between secure element 145 and issuer subsystem 350. Additionally or alternatively, an access key of a credential applet may be generated by transaction entity subsystem 400 and may be accessible by transaction entity subsystem 400 for enabling secure transmission of that credential applet between secure element 145 and transaction entity subsystem 400.

Additionally or alternatively, as shown in FIG. 5, secure element 145 may include ISD 152, which may include an ISD key that may also be known to a trusted service manager associated with that security domain (e.g., transaction entity subsystem 400). An ISD key may be leveraged by transaction entity subsystem 400 and electronic device 100 similarly to and/or instead of an access key for enabling secure transmissions between transaction entity subsystem 400 and secure element 145 of electronic device 100. Moreover, as shown in FIG. 5, various data may be communicated between processor 102 and secure element 145. For example, processor 102 of device 100 may be configured to run a device application 103 that may communicate information with a card management application 113b and/or provider application 113c of processor 102 as well as secure element 145, an I/O interface component 114a (e.g., for receiving I/O input data 115i and/or for transmitting I/O output data 115o), and/or communications component 106 (e.g., for communicating data with transaction entity subsystem 400, issuer subsystem 350, and/or provider subsystem 200).

Additionally or alternatively, as shown in FIG. 5, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it may not be inspected or modified by any entity, including an issuer of secure element 145. CASD 158 may be configured to include and/or may be configured to generate and/or otherwise include a CASD access kit (e.g., a CASD private key ("CASD-SK"), a CASD public key ("CASD-PK"), a CASD certificate ("CASD-Cert."), and/or a CASD-signing module). For example, CASD 158 may be configured to sign certain data on secure element 145 (e.g., using a CASD access kit) before providing such data to another portion of device 100 (e.g., communications component 106 for sharing with other subsystems of system 1). As an example, CASD 158 may be configured to sign any data that may be provided by secure element 145 such that other subsystems (e.g., transaction entity subsystem 400) may be able to confirm that such signed data was signed by secure element 145 (e.g., using an associated CASD kit at transaction entity subsystem 400).

Additionally or alternatively, as shown in FIG. 5, secure element 145 may include a contactless registry services ("CRS") applet or application 151 that may be configured to provide local functionality to electronic device 100 for modifying a life cycle state (e.g., activated, deactivated, locked, etc.) of certain security domain elements and sharing certain output information 115o about certain security domain elements in certain life cycle states with a user of device 100 (e.g., via a user I/O interface 114a). For example, CRS application 151 may include a CRS list 151t that may maintain a list of the current life cycle state of each security domain element on secure element 145 (e.g., a list that may include the life cycle state of one, some, or all of credential applet 153a of SSD 154a, credential applet 153b of SSD 154b, credential applet 153c of SSD 154c, and/or credential applet 153d of SSD 154d), where CRS application 151 may be configured to share the life cycle state of one or more security domain elements of secure element 145 with an application of device 100 (e.g., with any suitable application type, such as a daemon, as card management daemon ("CMD") application 113a that may be running as a background process inside an operating system application 103 and/or a card management application 113b but that may not be under the control of an interactive user of device 100), which in turn may provide certain life cycle state information to a user of device 100 as output information 115o via I/O interface 114a and a user interface ("UI") application (e.g., a UI of card management application 113b), which may enable a user to change a life cycle state of a security domain element (e.g., to update a CRS list 151t and a life cycle state of a security domain element, such as for enabling a commerce credential of a specific credential applet for use in an NFC communication 5). Additionally or alternatively, CRS 151 may include a CRS access key that may also be known to a trusted service manager associated with CRS 151 (e.g., transaction entity subsystem 400). A CRS access key may be leveraged by transaction entity subsystem 400 and electronic device 100 similarly to and/or instead of an access key for enabling secure transmissions between transaction entity subsystem 400 and secure element 145 of electronic device 100.

Card management application 113*b* or any other suitable application or functionality of processor 102 (e.g., application 103 and/or CMD application 113*a* running on processor 102) and/or controller 142 of NFC component 120 may be operative to generate, update, and/or otherwise manage a data structure or routing table that may be leveraged for determining how controller 142 may route data (e.g., commands) received by controller 142 from provider subsystem 200 (e.g., from terminal 220 as communication 5 via antenna 134 of device module 130). Such a routing table may be stored in a memory component (e.g., non-volatile memory) of controller 142 and/or as a portion of memory 104 (e.g., as a portion of an application accessible to processor 102). Card management application 113*b* may be operative to include or otherwise have access to at least a portion of one or more passes (e.g., pass 119*a*, pass 119*b*, pass 119*c*, and/or pass 119*d*), where each pass may be a digital representation of a credential (e.g., a credit card or debit card or coupon or transit pass or loyalty card, etc.) that may be accessed or utilized automatically by card management application 113*b* (e.g., in response to geographic location or a calendar event of device 100 or in response to antenna 134 and provider terminal 220 being enabled to communicate) and/or by a user via user interaction with card management application 113*b*. Each pass may be included in a package that may include data including any suitable file (e.g., a JavaScript Object Notation ("JSON") file) and/or image assets and the pass. Such data (e.g., in a JSON file) may describe the contents of the pass and may allow some control over the pass's presentation (e.g., visual appearance or otherwise) via application 113*b* (e.g., via I/O output data 115*o*), where such data may be signed using a private key for a certificate that may be associated with the developer of the pass (e.g., financial entity subsystem 350), where the developer may obtain such a key from any suitable source (e.g., transaction entity subsystem 400). Each pass may include or be linked in any suitable way to data of at least one operable credential application (e.g., credential data of one or more credential applets 153*a*-153*d* of one or more SSDs 154*a*-154*d* of secure element 145 and/or credential data of one or more host-based card emulation ("HCE") applications (not shown) that may be running on or otherwise accessible to processor 102 with the ability to offer a credential solution (e.g., an exact virtual representation of an electronic credential identity) without the need for a physical secure element). As described below, each pass may include any suitable link information that may be operative to link the pass with one or more credentials of device 100 (e.g., link information 117*a* of pass 119*a*, link information 117*b* of pass 119*b* link information 117*c* of pass 119*c*, and/or link information 117*d* of pass 119*d*). Additionally or alternatively, each credential application of device 100 may include any suitable link information that may be operative to link the credential application with one or more passes of device 100 (e.g., link information 157*a* of applet 153*a*, link information 157*b* of applet 153*b*, link information 157*c* of applet 153*c*, and/or link information 157*d* of applet 153*d*). Additionally or alternatively, secure element 145 may include SE link information 157*s* (e.g., link information or any suitable data table or other suitable construct, such as a global registry that may be managed by or provided by CRS 151) that may be operative to link one, some, or each credential application (e.g., one or more applets 153*a*-153*d*) of secure element 145 with one or more passes (e.g., one or more passes 119*a*-119*d*) that may be accessible by processor 102.

Description of FIG. 6, FIG. 7, and FIGS. 8A-8D

To facilitate the following discussion regarding the operation of system 1 for provisioning multiple credentials of a multi-scheme payment card on electronic device 100 for selective use in a transaction (e.g., with provider subsystem 200 (e.g., when a credential of a secure element of device 100 is being used as part of a communication 5 and/or a communication 672*o* between device 100 and provider subsystem 200)), reference is made to one or more processes of one or more flowcharts of FIGS. 6 and 7, to various components of system 1 of the schematic diagrams of FIGS. 1-5, and to front views of screens 190-190*d* that may be representative of a graphical user interface of electronic device 100 during such a transaction (e.g., as shown in FIGS. 3 and 8A-8D). The operation described may be achieved with a wide variety of graphical elements and visual schemes. Therefore, the embodiments of FIGS. 3 and 8A-8D are not intended to be limited to the precise user interface conventions adopted herein. Rather, embodiments may include a wide variety of user interface styles.

Description of FIG. 6

FIG. 6 is a flowchart of an illustrative process 600 for provisioning multiple credentials of a multi-scheme payment card on an electronic device for selective use in a transaction. Process 600 is shown being implemented by electronic device 100, provider subsystem 200, acquiring bank subsystem 300, transaction entity subsystem 400, and issuer subsystem 350. However, it is to be understood that process 600 may be implemented using any other suitable components or subsystems. Process 600 may provide a seamless user experience for provisioning multiple credentials of a multi-scheme card (e.g., a multi-scheme payment card) on electronic device 100 and/or for selective use of such credentials in a transaction (e.g., with provider subsystem 200). For example, a multi-scheme card may include two or more applet instances that may be provisioned on secure element 145 of electronic device 100 for representing different schemes of a single card (e.g., a single payment card or other suitable transaction mechanism). Link information may be provisioned on electronic device 100 in conjunction with the multiple applets in order to link the applets to one another and/or to a single pass that may be used to present information indicative of the multi-applet card to a user of device 100. The link information may be configured to instruct electronic device 100 as to whether or not a user of the device may be enabled to choose a particular one of the multiple applets of the card. Such link information and such applet instances may be generated by transaction entity subsystem 400 and/or issuer subsystem 350 before being provisioned on electronic device 100. A first of the provisioned applets may be a primary or main applet while following applets may be auxiliary or proxy applets respectively linked to the main or primary applet. A proxy applet may include an application identifier but no account number, and instead may be operative to communicate directly with an associated main applet for utilizing an account number of the main applet when the proxy applet is generating credential data for use in an electronic transaction between device 100 and provider subsystem 200.

Process 600 may begin at step 602, where device 100 may communicate credential provisioning request data 652 with transaction entity subsystem 400, where credential provisioning request data 652 may include a selection of at least one particular commerce credential or card to be provisioned on to device 100 as well as any other suitable information associated with device 100. For example, when a user selects at least one particular commerce credential or card for provisioning on to device 100 (e.g., through user interaction with GUI 180 on I/O interface 114a of device 100, such as during use of a card management application 113b (e.g., "Passbook" or "Wallet" application associated with "Passbook" icon 184 of FIG. 3)), the selection may be transmitted as at least a portion of credential provisioning request data 652 by device 100 to transaction entity subsystem 400. Such a user selected card request may include any suitable information indicative of the selected credential (e.g., a true or hashed version of a primary account number ("PAN") associated with the selected commerce credential). Additionally, such a user selected card request of credential provisioning request data 652 may include any suitable security information associated with the selected credential that may be used by issuer subsystem 350 for provisioning that credential onto device 100 (e.g., the card verification value ("CVV") for the selected credential, the expiration date for the selected credential, the billing address for the selected credential, etc.). For example, GUI 180 may enable electronic device 100 to prompt the user to authenticate a selected credential in one or more ways (e.g., by entering security information, such as the CVV of the selected credential and/or any other suitable security information that may be required by system 1 (e.g., by issuer subsystem 350) for provisioning the selected credential on device 100, or by taking a photograph of the physical card, etc.). Moreover, GUI 180 may also prompt the user to consider and accept various terms and conditions that may be applicable for provisioning the selected credential on device 100. Additionally or alternatively, credential provisioning request data 652 may include any other suitable information that may be useful to transaction entity subsystem 400 for enabling the provisioning of the selected credential on device 100 (e.g., an SSD identifier, which may be indicative of an available SSD 154 of NFC component 120 of device 100 that may be able to receive such a provisioned credential). Such a user selected card request may be transmitted by electronic device 100 as at least a portion of credential provisioning request data 652 to transaction entity subsystem 400 (e.g., to SMP broker 410 of transaction entity subsystem 400) via communications path 65 of FIG. 1. For example, communications component 106 of electronic device 100 may be configured to transmit credential provisioning request data 652 using any suitable communications protocol over any suitable communications path 65.

In some embodiments, credential provisioning request data 652 may be indicative of a request to provision at least one commerce credential applet onto electronic device 100 that is to be associated with a particular existing payment card that may be associated with a single particular funding primary account number ("FPAN") that may have been previously assigned to a user by an issuing bank or payment network of issuer subsystem 350. For example, a user may already possess a physical single-scheme payment card, such as a plastic credit card or debit card, that may have been issued by any suitable entity of issuer subsystem 350 for the user to use with respect to a single payment scheme, such as with respect to a single funding account (e.g., a credit card payment card associated with a single FPAN for a single credit card account managed by a single payment network subsystem), and credential provisioning request data 652 may be indicative of that single payment scheme payment card and indicative of a request to provision a single commerce credential applet onto electronic device 100 that is to be associated with that single payment scheme payment card and that is to enable device 100 to carry out the single payment scheme of that card using that single credential applet. However, in other embodiments, a user may already possess a physical multi-scheme payment card, such as a single plastic card, that may have been issued by one or more suitable entities of issuer subsystem 350 for the user to use with respect to multiple distinct payment schemes, and credential provisioning request data 652 may be indicative of that multi-scheme payment card and indicative of a request to provision at least one commerce credential applet onto electronic device 100 for association with those multiple distinct payment schemes of that multi-scheme payment card and for enabling device 100 to carry out the multiple payment schemes of that card using that at least one credential applet.

One particular example of such a multi-scheme payment card may be a co-branded or co-badged card, such as a single bank owned card that may be issued by a single issuing bank subsystem 370, that may provide for at least two different payment schemes that may be enabled by at least two different payment network subsystems or by the same payment network subsystem. For example, the Royal Bank of Canada may be a single issuing bank subsystem 370 that may issue a multi-scheme payment card that may provide for at least a first payment scheme credential as a global credit payment scheme credential that may be branded and/or managed by Visa Inc. as a first payment network subsystem 360a and a second payment scheme credential as a local debit payment scheme credential in Canada that may be branded and/or managed by the Interac Association of Canada as a second payment network subsystem 360b, where each one of the payment scheme credentials may be tied to the same funding account or different funding accounts of issuing bank subsystem 370 but may be associated with different networks and any suitable differences in service. As another example, an Australian bank may be a single issuing bank subsystem 370 that may issue a multi-scheme payment card that may provide for at least a first payment scheme credential as a checking account debit payment scheme credential that may be branded and/or managed by the Australian Electronic Funds Transfer at Point Of Sale ("EFTPOS") system as a first payment network subsystem 360a and a second payment scheme credential as a savings account debit payment scheme credential that may be branded and/or managed by the EFTPOS system as that same first payment network subsystem 360a, where each one of the payment scheme credentials may be associated with the same payment network (i.e., EFTPOS as payment network subsystem 360a) but may be associated with different funding accounts of issuing bank subsystem 370 (e.g., a checking account FPAN of issuing bank subsystem 370 and a savings account FPAN of issuing bank subsystem 370). As yet another example, the Discover Bank or any other suitable bank may be a single issuing bank subsystem 370 that may issue a multi-scheme payment card that may provide for at least a first payment scheme credential that may be branded and/or managed by Discover Expresspay (ZIP) of Discover Financial Services as a first payment network subsystem 360a and a second payment scheme credential that may be branded and/or managed by Diner's Club International as a second payment network subsystem 360b, where each one of the payment scheme credentials may be tied to the same funding account of issuing bank subsystem 370, but may be associated with different networks and/or any suitable differences in service. Therefore, process 600 may be operative to efficiently provision such a multi-scheme payment card onto device 100 that may be represented on device 100 (e.g., on secure element 145) by at least two distinct credential applets (e.g., by at least two distinct ones of credential applets 153a-153d) for enabling generation and communication of at least two different commerce credential data communications (e.g., at least two different AIDs 155 and/or at least two different PANs 159) between device 100 and provider subsystem 200 for the at least two different payment schemes, but that may also be represented on device 100 by a single unique pass (e.g., by a single one of passes 119a-119d that may be representative of a particular multi-scheme payment card) for enabling a simple and non-confusing interface for a user of device 100 that may tend to associate the different payment scheme credentials with a single instance of a card. As such, at step 602, multi-scheme card provisioning request data 652 may be received by transaction entity subsystem 400.

As shown in FIG. 6, after step 602, process 600 may include a step 604, where transaction entity subsystem 400 may be operative to discover any suitable multi-scheme properties with respect to the multi-scheme card (e.g., identify of any credential(s) that may be associated with the multi-scheme card) that may be identified by multi-scheme card provisioning request data 652 and/or to determine any suitable provisioning rules (e.g., choice or no choice) that ought to be followed for provisioning on electronic device 100 any credentials associated with the multi-scheme card that may be identified by multi-scheme card provisioning request data 652. For example, transaction entity subsystem 400 may determine the characteristics of each credential and/or payment network and/or issuing bank and/or PAN and/or any other suitable information with respect to each entity that may be related to one or more of the payment scheme credentials identified by request data 652 in order to make any suitable determinations, such as whether one payment scheme or associated issuer or network entity may be utilized for a primary or main scheme or credential while another payment scheme or associated issuer or network entity may be utilized as an auxiliary or proxy scheme or credential. Such determinations may be made based on any suitable regulations and/or any suitable instructions or data that may be accessible to transaction entity subsystem 400 by any other suitable authority, such as government regulations and/or preferences and/or priorities of one or more entities of issuer subsystem 350. For example, in some embodiments, transaction entity subsystem 400 may be operative to generate and/or access and/or maintain any suitable data structure or routing table of data (e.g., table 482 of server 480 or of any suitable portion of transaction entity subsystem 400 of FIG. 4, which may be at least partially populated by data from a remote source) that may be used by transaction entity subsystem 400 to identify in that data structure an association between any particular type of information from card provisioning request data 652 (e.g., a PAN of an existing card of a user of device 100 (e.g., as may be referred to as a request PAN herein)) and the identity of one or more payment network subsystems and/or the identity of one or more issuing bank subsystems that may be at least partially responsible for provisioning on electronic device 100 one or more credentials associated with the card that may be identified by card provisioning request data 652, where such data (e.g., data of table 482) may also be used by transaction entity subsystem 400 to determine a relationship (e.g., primary-auxiliary, main-proxy, etc.) between two or more such identified financial subsystems that may then be utilized by transaction entity subsystem 400 to effectively and efficiently facilitate the provisioning of two or more credentials of the multi-scheme card on electronic device 100 using those two or more subsystems. At step 604, transaction entity subsystem 400 may be operative to determine how many SSD's and credential applets and/or how many passes ought to be provisioned onto device 100 in order to successfully enable each one of the multiple payment credentials of the multi-scheme card to be utilized by device 100.

Once any properties with respect to the multi-scheme card have been discovered and/or any rules with respect to provisioning the multi-scheme card have been determined at step 604, based on such discoveries and/or determinations, transaction entity subsystem 400 may be operative to initiate the provisioning of a first or primary or main payment scheme credential of the multiple payment scheme credentials onto electronic device 100 at step 606, for example, by running a risk analysis and/or creating a first SSD for the first payment scheme credential. For example, risk analysis of step 606 may include at least one suitable risk assessment on the first payment scheme credential that has been selected to be provisioned, where such risk assessment may take into account specific attributes of device 100 itself. As just one example, the risk analysis of step 606 may include a transaction entity fraud risk analysis that may be conducted by transaction entity subsystem 400 and/or a financial entity fraud risk analysis that may be conducted by issuer subsystem 350 (e.g., as described in U.S. Patent Application Publication No. 2015/0058191, filed Nov. 27, 2013, which is hereby incorporated by reference herein). If the first payment scheme credential identified at step 604 for provisioning on device 100 successfully passes a risk analysis portion of step 606, then transaction entity subsystem 400 may proceed to an SSD creation portion of step 606. However, if the first payment scheme credential identified at step 604 for provisioning on device 100 does not meet suitable risk thresholds of the risk analysis portion of step 606, transaction entity subsystem 400 may take additional precautionary steps (not shown in FIG. 6) for increasing the confidence with which system 1 may determine that a credential ought to be provisioned on device 100 (e.g., steps may be taken to enable communication of one-time password data between issuer subsystem 350 and device 100 for that first payment scheme credential).

At an SSD creation portion of step 606, an SSD may be created by transaction entity subsystem 400 (e.g., by SMP broker component 410) for that first payment scheme credential. For example, an identifier for an SSD of device 100 (e.g., an SSD 154 of NFC component 120) into which the first payment scheme credential may be provisioned may be created at step 606, where the SSD may be at least partially determined based on the secure element information (e.g., an SSD identifier) that may be provided by request data 652 of step 602. Next, after step 606, transaction entity subsystem 400 (e.g., SMP broker component 410) may send a request to issuer subsystem 350 for the provisioning of the selected first payment scheme credential on device 100 (e.g., using any suitable communications protocol over any suitable communications path 55 (e.g., via a TSM of path 55)). For example, at step 608 of process 600 of FIG. 6, transaction entity subsystem 400 may generate and transmit credential provisioning instruction data of information 658 for the first payment scheme credential to issuer subsystem 350 (e.g., to an appropriate payment network subsystem 360 (e.g., first payment network subsystem 360*a*) of issuer subsystem 350 (e.g., the identity of that target subsystem may have been determined at step 604)). In some embodiments, such a credential provisioning instruction may only be generated and transmitted if transaction entity subsystem 400 determines that the selected credential ought to be provisioned on device 100. For example, such a determination may be made if the selected first payment scheme credential successfully passes the risk analysis of step 606. Alternatively, if the selected first payment scheme credential does not successfully pass the risk analysis of step 606, transaction entity subsystem 400 may still make a determination to proceed with step 608. Credential provisioning instruction data 658 may include any suitable data that issuer subsystem 350 may use to begin provisioning the selected first payment scheme credential on device 100, such as data indicative of the selected first payment scheme credential (e.g., secure data for the selected first payment scheme credential (e.g., the credential's PAN of data 652) and/or identification of an available SSD 154 of device 100 (e.g., of step 606) for receiving the provisioned credential, which may be encoded with a security key in a suitable manner for communication by transaction entity subsystem 400 over communication path 55 to issuer subsystem 350).

In response to receiving such first payment scheme credential provisioning information 658 from transaction entity subsystem 400, issuer subsystem 350 (e.g., first payment network subsystem 360*a*) may be configured to generate a descriptor of the selected first payment scheme credential to be provisioned, as well as visual artwork and other metadata that may be provided on device 100 for aiding user interaction with the credential once provisioned (e.g., for creating at least a portion of a pass 119 that may be associated with the credential). For example, also at step 608 of process 600 of FIG. 6, issuer subsystem 350 may pull specific data from a first portion of first payment scheme credential provisioning information 658 (e.g., the credential identification information for the selected credential), access one or more databases of information available to issuer subsystem 350 that may be useful for generating one or more descriptors and/or various types of metadata that may aid any eventual user interaction with the credential once provisioned on device 100, and then issuer subsystem 350 may generate and transmit credential provisioning response data as at least a portion of information 658 back to transaction entity subsystem 400. Such credential provisioning response data may include a descriptor of the first payment scheme credential to be provisioned and any suitable metadata that ought to be provided on device 100 for aiding user interaction with the first payment scheme credential to be provisioned. For example, such credential provisioning response data of information 658 may include some or all suitable data that may enable device 100 to make the credential visually appear as available to device 100, such as visual logos/icons and other user discernible data associated with the credential that may be provided to the user (e.g., when the specific icon 182 labeled with a "Passbook" textual indicator 181 (i.e., specific icon 184) of FIG. 3 is selected, device 100 may launch or otherwise access a specific passbook or wallet or card management application 113*b* and may display screens of a specific user interface that may include one or more visual descriptors of the credential, such as at least a visual portion of a particular pass (e.g., pass 119*a*) that may be associated with the credential being provisioned). Such credential provisioning response data generated by issuer subsystem 350 may be transmitted by issuer subsystem 350 (e.g., by an appropriate payment network subsystem 360 (e.g., first payment network subsystem 360*a*)) to transaction entity subsystem 400 (e.g., to SMP broker component 410) via communications path 55 of FIG. 1 using any suitable communications protocol over any suitable communications path type (e.g., via a TSM of communications path 55).

In some embodiments, system 1 and/or process 600 may be configured to provision a first virtual credential on device 100 rather than the actual first payment scheme credential that may be identified at step 602 and/or that may be used for the fraud risk analysis of step 606. For example, once it is determined that a first payment scheme credential is to be provisioned on device 100, it may be requested (e.g., by issuer subsystem 350 at step 610, by transaction entity subsystem 400 at step 608, and/or by a user of device 100 at step 602) that a first virtual credential be generated, linked to the actual credential, and provisioned on device 100 instead of the actual first payment scheme credential. That is, transaction entity subsystem 400 may generate and transmit credential provisioning instruction data as a portion of information 658 at step 608 that may also include a specific instruction for issuer subsystem 350 to create a new virtual credential (e.g., a device primary account number ("D-PAN")), link that virtual credential with the selected actual credential (i.e., a funding primary account number ("F-PAN") originally issued by the issuing bank), and then provision that virtual credential onto device 100. Accordingly, in such embodiments, issuer subsystem 350 may generate and transmit credential provisioning response data of information 658 back to transaction entity subsystem 400 at step 608 that may include a descriptor of the virtual credential (e.g., the D-PAN) to be provisioned and any suitable metadata that ought to be provided on device 100 for aiding user interaction with the virtual credential to be provisioned (e.g., as a portion of a pass associated with the credential). Alternatively, in some embodiments, electronic device 100 may generate and transmit credential provisioning request data 652 at step 602 that may also include a specific instruction for issuer subsystem 350 to create, link, and provision such a new virtual credential rather than the actual first payment scheme credential indicated by credential provisioning request data 652, where such a specific instruction may be passed on to issuer subsystem 350 via credential provisioning instruction data of information 658 at step 608. Alternatively, in some embodiments, issuer subsystem 350 may make a determination to create, link, and provision a new virtual credential rather than the actual first payment scheme credential indicated by data 652 and/or information 658.

Such linking or other suitable association of a virtual credential with an actual credential may be performed by any suitable component of issuer subsystem 350. For example, issuer subsystem 350 (e.g., a particular payment network subsystem 360*a* that may be associated with the brand of the actual first payment scheme credential identified at step 604 and/or an associated issuing bank subsystem 370) may define and store an entry in a virtual-linking table or data structure 352 (e.g., as shown in FIG. 1) at step 610 of process 600, where such an entry may create an association or link between the actual credential and a virtual credential (it is to be understood that step 610 may occur during step 608 (e.g., between receipt of certain data of information 658 by issuer subsystem 350 and transmission of certain other data of information 658 by issuer subsystem 350)). Thus, when a virtual credential is utilized by device 100 for a financial transaction with provider subsystem 200 (e.g., after the virtual credential has been provisioned on device 100), issuer subsystem 350 may receive an authorization request indicative of that virtual credential (e.g., as data 680, described below) and may conduct an analysis of that authorization request in light of the actual credential associated or otherwise linked with the identified virtual credential as determined by virtual-linking table 352 (e.g., at step 632 of process 600, described below). By provisioning a virtual credential on device 100 rather than an actual credential, issuer subsystem 350 may be configured to limit the fraudulent activity that may result if the virtual credential is intercepted by an unauthorized user (e.g., by an NFC communication 5 signal stealer positioned adjacent device 100 and/or provider terminal 220), as issuer subsystem 350 (e.g., payment network subsystem 360a and/or issuing bank subsystem 370) may only be configured to utilize virtual-linking table 352 for linking the virtual credential to the actual credential during certain transactions (e.g., during NFC transactions received by provider terminal 220 and not during transactions where credential information has been manually entered by a user). Therefore, in such embodiments using a virtual credential, provisioning response data of information 658 generated by issuer subsystem 350 may contain a new D-PAN (e.g., new virtual credential information) from an entry in table 352 that may define a link between an F-PAN (e.g., an actual credential banking number) of the selected first payment scheme credential from data 652 and this new D-PAN. Provisioning response data of information 658 may also include the last four digits or any other suitable data of the linked F-PAN for creating a hashed version of the F-PAN. Providing both the virtual D-PAN and a hashed version of the actual F-PAN on device 100 may prevent user confusion between the two and may enable easier user association of the two when utilizing a virtual credential for a financial transaction. Therefore, in some embodiments, a full version of an F-PAN (e.g., an actual credential banking number) may never be stored on device 100, but rather only an associated D-PAN (e.g., a linked virtual credential) may be stored in non-hashed form on device 100. Provisioning response data of information 658 may also include a unique D-PAN hash (e.g., the last four digits of the D-PAN and/or any other suitable data for creating a hashed version of the D-PAN that may be used in all subsequent calls to reference this D-PAN while maintaining security of the D-PAN). Provisioning response data of information 658 may also include an "AuthToken" or any other suitable token that may be a one-time use token for enabling provision of the first payment scheme credential.

Next, in response to receiving credential provisioning response data of information 658, transaction entity subsystem 400 (e.g., SMP broker component 410) may pass some or all of the information contained in that credential provisioning response data to device 100 in order to at least partially prepare device 100 for having a first payment scheme credential provisioned thereon. For example, at step 612 of process 600 of FIG. 6, transaction entity subsystem 400 (e.g., SMP broker component 410) may analyze the received credential provisioning response data of information 658 and may then generate and transmit first credential device data 662, such as pass data, to electronic device 100. Such pass data may include any suitable description or identification of the first payment scheme credential to be provisioned (e.g., a hashed-version of the credential's PAN, virtual and/or actual (e.g., D-PAN and/or F-PAN)), as well as any associated metadata, all of which may be provided by credential provisioning response data of information 658 of step 608. Such pass data of first credential device data 662 may also include information associated with the particular SSD 154 of device 100 that may have the first payment scheme credential provisioned thereon (e.g., an SSD identifier of a particular SSD 154, as may be provided by step 606, which may be at least partially determined based on the secure element information provided by data 652 of step 602). Such pass data may be transmitted by transaction entity subsystem 400 to electronic device 100 via communications path 65 of FIG. 1. For example, communications component 106 of electronic device 100 may be configured to receive such pass data using any suitable communications protocol over any suitable communications path 65.

Next, in response to receiving such pass data from transaction entity subsystem 400, device 100 may be configured to generate and add a disabled pass (e.g., pass 119a) to card management application 113b and to add a linked SSD (e.g., SSD 154a) of NFC memory module 150 (e.g., automatically, without any required user interaction at device 100). For example, after or during at least a portion of step 612 of process 600 of FIG. 6, device 100 may process received pass data of first credential device data 662 and may then generate and add a "disabled pass" as pass 119a to card management application 113b and an SSD 154a to secure element 145 of NFC memory module 150 (e.g., the particular SSD 154 that may be identified by the received pass data). At such an add disabled pass step (not shown explicitly in FIG. 6), such pass data received at step 612 may enable device 100 to make the first payment scheme credential seem available to device 100 for use, such as through visual logos/icons and/or any other suitable user discernible data associated with pass 119a that may now be associated with the first payment scheme credential and credential descriptor information that may be provided to the user (e.g., via card management application 113b the presentation of that pass 119a may be provided as I/O output data 115o on I/O interface 114a).

As another portion of step 608, issuer subsystem 350 may initiate generation and transmission of one or more put pending commands for transaction entity subsystem 400 and, thus, device 100. For example, at step 608 of process 600 of FIG. 6, issuer subsystem 350 may generate and transmit put pending command data as a portion of information 658 to transaction entity subsystem 400 (e.g., to SMP-TSM component 420 of transaction entity subsystem 400). In some embodiments, such put pending command data may include the primary account number 159a (e.g., D-PAN or F-PAN, hashed or not) of the first payment scheme credential being provisioned, an Application identifier ("AID") 155a for the applet 153a of the data of the first payment scheme credential being provisioned at SSD 154a, an SSD identifier, and/or an SSD counter. For example, an AID may identify a specific card scheme and product, program, or network (e.g., MasterCard Cirrus, Visa PLUS, Interac, etc.), where an AID may include not only a registered application provider identifier ("RID") that may be used to identify a payment system (e.g., card scheme) or network (e.g., MasterCard, Visa, Interac, etc.) of the credential associated with the AID but also a proprietary application identifier extension ("PIX") that may be used to differentiate between products, programs, or applications offered by a provider or payment system of the credential associated with the AID. Any suitable specification (e.g., a Java Card specification) that may be operative to preside over firmware of secure element 145 may be operative to ensure or otherwise force the uniqueness of each AID on secure element 145 (e.g., each credential instance on secure element 145 may be associated with its own unique AID). Then, in response to receiving such put pending command data, transaction entity subsystem 400 (e.g., SMP-TSM component 420) may issue notification data as a portion of first credential device data 662 to device 100 at step 612 of process 600 of FIG. 6 based on such put pending command data of information 658. Such put pending command data and/or notification data may include one or more perso-Scripts or GlobalPlatform APDU scripts (e.g., any scripts, any rotate keys (e.g., if necessary), and any other suitable administrative elements that may be used to provision a usable PAN on device 100). For example, as shown in FIG. 5, after step 612, the provisioning of the first payment scheme credential may result in pass 119*a* being stored on device 100 for use by card management application 113*b* and may result in first SSD 154*a* being provisioned on device 100 (e.g., secure element 145) to include applet 153*a* with PAN 159*a* and AID 155*a* of the first payment scheme credential. Moreover, each one of pass 119*a* and SSD 154*a* (e.g., applet 153*a*) may be provided with suitable respective link information (e.g., pass 119*a* may be provided to include link information 117*a* and SSD 154*a* may be provided to include link information 157*a*) that may be operative to link pass 119*a* and applet 153*a* of SSD 154*a* in one or more suitable ways. Next, in response to receiving such notification data from transaction entity subsystem 400, device 100 may be configured to complete any of the received scripts from the notification data of step 612 and/or take any other suitable action for enabling the first payment scheme credential (e.g., for toggling the credential from a disabled/pending activation state to an enabled/active for use state).

Therefore, the state of the secure element on device 100 (e.g., whether the credential's PAN is enabled for use in NFC component 120) may be updated asynchronously with (e.g., later than) an availability status of the credential that may be provided to a user of device 100 (e.g., provided visually by pass 119*a* by card management application 113*b* on I/O interface 114*a*). This may enable the first payment scheme credential to appear ready for use to a user of device 100 before it is actually ready for use, thereby providing a more desirable user experience (e.g., an apparently faster provisioning time). Once the first payment scheme credential is at least disabled on device 100 (e.g., as either the actual credential or a linked virtual credential) and/or enabled, device 100 may automatically generate a user interface that may inform the user that the first payment scheme credential has been successfully provisioned. For example, GUI 180 may provide a screen on I/O interface 114*a*, where electronic device 100 may provide a message to the user indicative of the completed provisioning and enablement of the first payment scheme credential. Alternatively, issuer subsystem 350 may be configured to generate and transmit the contents of the response data and pending command data of information 658 at the same time (e.g., in a single iteration of step 608) rather than as distinct sets of information at different portions of step 608. Additionally or alternatively, transaction entity subsystem 400 may be configured to generate and transmit the contents of the pass data and notification data at the same time (e.g., in a single iteration of step 612) rather than as distinct sets of information at different portions of step 612. Alternatively or additionally, although not shown in FIG. 6, additional data (e.g., a one-time password) may be communicated to device 100. In some embodiments, the provisioning of a first payment scheme credential onto device 100 of steps 602-612 may be combined into fewer steps. For example, issuer subsystem 350 may be configured to provision a first payment scheme credential directly onto device 100 without communicating via transaction entity subsystem 400 (e.g., any two or more of steps 602, 604, 608, and 612 may be combined into one or more communications directly between issuer subsystem 350 and device 100 (e.g., via communications path 75 of FIG. 1) using any suitable communications protocol or protocols). Therefore, process 600 may enable at least one selected first payment scheme credential to be provisioned on electronic device 100 as either an actual credential or a virtual credential linked to an actual credential by issuer subsystem 350. Moreover, device 100 may be configured to generate and transmit process pending command data to issuer subsystem 350 directly (e.g., via communications path 75) or indirectly via transaction entity subsystem 350 (e.g., via SMP-TSM component 420) after step 612, where such process pending command data may indicate to issuer subsystem 350 that the provisioning of the first payment scheme credential has been completed on device 100.

After step 612 or concurrently with one or more of steps 606-612, process 600 may also include steps 614, 616 (e.g., with information 666), 618, and 620 (e.g., with data 670), which may be similar to respective steps 606, 608, 610, and 612, but with respect to a second payment scheme credential as may have been identified at step 604 rather than with respect to the first payment scheme credential identified at step 604. That is, steps 614-620 may be operative to provision on to electronic device 100 a second payment scheme credential of the multi-scheme card provisioning request of step 602. In some embodiments, step 616 may include communicating information between transaction entity subsystem 400 and financial entity subsystem 350 for the provisioning of second payment scheme credential via one or more different entities of financial entity subsystem 350 than with respect to step 608 for the provisioning of the first payment scheme credential. For example, while step 608 may have been described with respect to use of first payment network subsystem 360*a* for provisioning the first payment scheme credential on device 100 (e.g., in SSD 154*a*), a different second payment network subsystem 360*b* may be utilized for provisioning the second payment scheme credential on device 100 (e.g., if each payment scheme is enabled by different payment networks (e.g., Interac and Visa), as may be determined at step 604). In other embodiments, however, the same payment network subsystem (e.g., first payment network subsystem 360*a*) may be utilized for provisioning each one of the first payment scheme credential and the second payment scheme credential on device 100 (e.g., EFTPOS for both checking and savings scheme credentials). Moreover, in some embodiments, table 352 that may be used for the provisioning of the first payment scheme credential at step 610 may be similarly used for the provisioning of the second payment scheme credential at step 618. Alternatively, in other embodiments, a distinct second table 362 may be utilized for the provisioning of the second payment scheme credential at step 618 (e.g., where the different tables may be associated with different payment networks or may be utilized at different suitable times by a single component of issuer subsystem 350). In some embodiments, a portion of information 666 that may be provided by transaction entity subsystem 400 to financial entity subsystem 350 at step 616 may include any suitable information indicative of the previous credential provisioned on device 100 at steps 606-612, such that financial entity subsystem 350 may be operative to generate a new separate D-PAN for the new credential to be provisioned but that may be linked to the same F-PAN as that of the previously provisioned credential (e.g., such that two tokens may be created for the same F-PAN) or that may be linked to a different F-PAN but still associated in some way with the previously provisioned credential (e.g., for life cycle maintenance) or such that the same D-PAN as used for the previously provisioned credential may be re-used for the new credential to be provisioned (e.g., such that PAN 159a may be the same as or different than PAN 159b, each of which may be linked to the same F-PAN or to different F-PANs at financial entity subsystem 350).

In response to receiving pass data of information 666 of step 616 from transaction entity subsystem 400 at step 620, rather than generating and updating a new pass for the new second payment scheme credential being provisioned, device 100 may be configured to use that new pass data to update an existing pass in any suitable way (e.g., pass 119a as may have been previously generated with respect to the first payment scheme credential), yet may also add a linked SSD (e.g., SSD 154b) of NFC memory module 150 to that pass (e.g., automatically, without any required user interaction at device 100). For example, after or during at least a portion of steps 616-620 of process 600 of FIG. 6, device 100 may process received pass data of second credential device data 670 and may then update pass 119a based on any suitable data of information 666 from issuer subsystem 350 and/or that may otherwise be provided by transaction entity subsystem 400 in data 670 (e.g., for enabling that pass 119a to represent via card management application 113b both the first payment scheme credential of steps 606-612 and the second payment scheme credential of steps 614-620), and device 100 may then add SSD 154b to secure element 145 of NFC memory module 150 (e.g., the particular SSD 154 that may be identified by the new received pass data). At such an add secondary pass data step, such pass data from step 620 may enable device 100 to make the second payment scheme credential seem available to device 100 for use, such as through visual logos/icons and/or any other suitable user discernible data associated with pass 119a that may now be associated with the first payment scheme credential and the second payment scheme credential and credential descriptor information that may be provided to the user (e.g., via card management application 113b the presentation of that pass 119a may be provided as I/O output data 115o on I/O interface 114a).

As another portion of step 620, issuer subsystem 350 may initiate generation and transmission of one or more put pending commands for transaction entity subsystem 400 and, thus, device 100 for the second payment scheme credential. For example, at step 616 of process 600 of FIG. 6, issuer subsystem 350 may generate and transmit put pending command data as a portion of information 666 to transaction entity subsystem 400 (e.g., to SMP-TSM component 420 of transaction entity subsystem 400). In some embodiments, such put pending conmiand data may include the primary account number 159b (e.g., D-PAN or F-PAN, hashed or not) of the second payment scheme credential being provisioned, an Application identifier ("AID") 155b for the applet 153b of the data of the second payment scheme credential being provisioned at SSD 154b, an SSD identifier, and/or an SSD counter. Then, in response to receiving such put pending command data, transaction entity subsystem 400 (e.g., SMP-TSM component 420) may issue notification data as a portion of second credential device data 670 to device 100 at step 620 of process 600 of FIG. 6 based on such put pending command data of information 666. Such put pending conmiand data and/or notification data may include one or more persoScripts or GlobalPlatform APDU scripts (e.g., any scripts, any rotate keys (e.g., if necessary), and any other suitable administrative elements that may be used to provision a usable PAN on device 100 and/or at least an AID that may be associated with the second payment scheme credential). For example, as shown in FIG. 5, after step 620, the provisioning of the second payment scheme credential may result in pass 119a being updated and/or stored on device 100 for use by card management application 113b and in second SSD 154b being provisioned to include applet 153b with PAN 159b and/or AID 155b of the second payment scheme credential. Moreover, each one of pass 119a and SSD 154b (e.g., applet 153b) may be provided with suitable respective link information (e.g., pass 119a may be provided to include updated link information 117a and SSD 154b may be provided to include link information 157b) that may be operative to link pass 119a and applet 153b of SSD 154b in one or more suitable ways. For example, while link information 117a of pass 119a may be initially provided on device 100 at step 612 so as to be linked with secure element 154a of the first payment scheme credential being provisioned at steps 606-612, link information 117a of pass 119a may be updated at step 620 so as to be additionally linked with secure element 154b of the second payment scheme credential being provisioned at steps 614-620 (e.g., link information 117a may be updated to be linked not only with first credential applet 153a but now also with second credential applet 153b) in one or more suitable ways. Next, in response to receiving such notification data from transaction entity subsystem 400, device 100 may be configured to complete any of the received scripts from the notification data of step 620 and/or take any other suitable action for enabling the second payment scheme credential (e.g., for toggling the credential from a disabled/pending activation state to an enabled/active for use state).

Any suitable pass(es) and any suitable applet(s) may be associated with one another in any suitable ways for providing an effective multi-scheme card on device 100. For example, when a pass of a specific credential is being provisioned on device 100 using pass data of device data 662 at step 612 and/or of device data 670 at step 620, such pass data may include AID information stored in the pass that may be indicative not only of the AID of that specific credential being provisioned but also of any additional AIDs of any additional credentials that may be associated with that specific credential being provisioned (e.g., pass data of pass 119a may include AID information indicative not only of AID 155a when the credential of primary SSD 154a is being provisioned at step 612 but also of AID 155b when the credential of associated auxiliary SSD 154b is being provisioned at step 620). As just one example, transaction entity subsystem 400 and/or issuer subsystem 350 may be operative to define and communicate to device 100 such pass data indicative of two or more AIDs (e.g., primary AID and one or more associated auxiliary AIDs and/or main AID and one or more associated proxy AIDs) by changing the way a pass may be formatted or represented (e.g., by altering how the JSON file of a pass may be formatted to include information indicative of multiple associated AIDs). Additionally, when data for each credential instance is generated and then provisioned on secure element 145 (e.g., as notification data and/or put pending command(s) of credential device data 662 at step 612 and of credential device data 670 at step 670), such data may include any suitable parameters or information to have one or more flags or registers selectively set to indicate whether or not that credential is a part of a multi-scheme card and/or to have one or more flags or registers selectively set to indicate whether or not that credential may be optionally chosen by a user for use in a transaction. For example, when transaction entity subsystem 400 installs applets 153a and 153b on secure element 145 during provisioning of a multi-scheme payment card, transaction entity subsystem 400 and/or issuer subsystem 350 may be operative to define notification data and/or put pending command data that may raise one or more suitable flags (e.g., set one or more registers) of the secure element (e.g., as a portion of AID information 155 of a particular applet and/or as a portion of link information 157 of a particular applet or of CRS 151 or otherwise) during provisioning of each applet or otherwise to indicate whether or not an applet is part of a pass of a single- or multi-scheme payment card (e.g., based on the status of a first flag associated with that applet) and/or to indicate whether or not the applet may be operative with "user choice" or "no user choice" capabilities (e.g., based on the status of a second flag associated with the applet). Device 100 may be configured to utilize such data of one or more provisioned passes 119 and such data of one or more provisioned applets on the secure element to determine which applet(s) may be associated with which pass(es) and which applet(s) may be able to be optionally presented by device 100 for user selection for use in a transaction (e.g., card management daemon application 113a may be operative to pull such applet data out of the secure element and combine it with such pass data to determine the configuration and relationship(s) between various applets and passes on device 100).

Transaction entity subsystem 400 may be operative to generate and/or define any suitable link information for use in any one or more of link information 117a, 157a, and/or 157b for enabling pass 119a to be linked with SSD 154a and SSD 154b (e.g., such that a single pass may be associated with two different applets 153a and 153b of two different provisioned payment scheme credentials). Transaction entity subsystem 400 may be operative to generate and utilize such link information (e.g., at step 612 and/or step 620) based on any suitable properties and/or rules that may be discovered and/or determined with respect to the multi-scheme card of data 652 (e.g., at step 604), where such link information may be associated with the pass and each applet without issuer subsystem 350 having to be provided with any information that identifies such a link. That is, issuer subsystem 350 may be operative to provision the first payment scheme credential on device 100 at steps 608 and 612 independent from provisioning the second payment scheme credential on device 100 at steps 616 and 620, such that if two different entities of issuer subsystem 350 may be utilized for the two different payment scheme credentials (e.g., first payment network subsystem 360a with the first payment scheme credential and second payment network subsystem 360b with the second payment scheme credential), those two entities need not work in conjunction with each other to enable the appropriate linking. Instead, transaction entity subsystem 400 may be operative to function (e.g., using a multi-scheme provisioning API) as an intermediary between device 100 and issuer subsystem 350 for enabling such linking of different payment scheme credentials being provisioned by different (and perhaps competitive or non-cooperative) entities of issuer subsystem 350 (e.g., Interac and Visa). Additionally or alternatively, instead of or in addition to providing appropriately functional link information 157a and 157b in respective SSDs 154a and 154b, process 600 may be operative to store such link information as SE link information 157s (e.g., link information or any suitable data table or other suitable construct, such as a global registry that may be managed by or provided by CRS 151) that may be operative to link credential applets 153a and 153b of secure element 145 with link information 117a of pass 119a (e.g., through associating any suitable identifiers of such applets (e.g., AIDs 155a and 155b with such SE link information 157s). In some embodiments, transaction entity subsystem 400 may be operative to generate and/or maintain any suitable data structure or table of data (e.g., any suitable table (e.g., table 482) of server 480 or of any suitable portion of transaction entity subsystem 400 of FIG. 4) that may track the various linkings of credential applets (e.g., to each other and/or to one or more passes) on electronic device 100. For example, at one or more of steps 604, 606, 608, 612, 614, 616, and 620, table 482 may be updated when any new credential information is being provisioned on device 100 such that table 482 may provide transaction entity subsystem 400 with an updated account of each linked credential on device 100 and the relationship of each linked credential with its other linked credentials and/or with its linked passes. Additionally or alternatively, in some embodiments, any suitable portion of issuer subsystem 350 (e.g., a single issuing bank subsystem 370 that may be associated with two or more linked credentials) may be operative to generate and/or maintain any suitable data structure or table of data (e.g., table 382 of FIG. 1) that may track the various linkings of two or more credential applets (e.g., to each other and/or to one or more passes) on electronic device 100. For example, at one or more of steps 608, 610, 616, and 618, table 382 may be updated when any new credential information is being provisioned on device 100 such that table 382 may provide issuer subsystem 350 with an updated account of each linked credential on device 100 and the relationship of each linked credential with its other linked credentials and/or with its linked passes.

CRS list 151t may be operative to update the life cycle state of linked credentials in any suitable way (e.g., based on link information 157s and/or any other link information of device 100). For example, when one credential applet is marked for deletion from device 100, CRS list 151 t may be leveraged such that other credential applets that may be linked to that marked applet (e.g., other applets associated with the same multi-scheme card as the marked applet) may also be marked for deletion. The secure deletion of a commerce credential from electronic device 100 may be initiated when electronic device 100 is not communicatively coupled to a remote subsystem responsible for the management of that commerce credential (e.g., to issuer subsystem 350 and/or to transaction entity subsystem 400). For example, while electronic device 100 is not communicatively coupled to a responsible remote subsystem, a life cycle state of a commerce credential may be updated locally on electronic device 100 (e.g., via user interaction with card management application 113b) such that the commerce credential may no longer be used by electronic device 100 in any commercial transaction and/or such that the existence of the commerce credential on electronic device 100 may no longer be indicated by the device to a user, and that updated life cycle state may later be shared with the responsible remote subsystem once electronic device 100 eventually is communicatively coupled to the responsible remote subsystem such that the responsible remote subsystem may take appropriate action to complete the secure deletion of the commerce credential from electronic device 100. In such examples, when a life cycle state of a first commerce credential (e.g., credential applet 153a of SSD 154a) may be updated (e.g., marked for deletion) on electronic device 100 or at transaction entity subsystem 400 (e.g., via user interaction with card management application 113b), device 100 and/or transaction entity subsystem 400 may be operative to automatically determine the existence of any other credentials on device 100 that may be linked to that updated credential (e.g., using link information 157s and/or any other link information of device 100) and may then be operative to automatically update the life cycle state of any such other linked credentials in a similar fashion (see, e.g., U.S. Patent Application Publication No. 2015/0178723, published on Jun. 25, 2015, which is hereby incorporated by reference herein). For example, if one credential gets suspended or deleted, all linked credentials may get likewise suspended or deleted. Link information 157 on secure element 145 and/or link information 117 of one or more passes may be used to identify the relationship between different credentials and determine which other applets should also have its status changed when an associated (e.g., linked) applet has its status changed (e.g., such that all credentials of a multi-scheme card may be marked for delete at the same time).

Once each credential of a multi-scheme card has been provisioned and enabled on device 100 (e.g., at steps 602-620), process 600 may also authenticate and use one or more of those credentials in a financial transaction. At step 622, provider communication initiation data 672 may be communicated between electronic device 100 and provider subsystem 200 (e.g., as an NFC communication 5 between NFC component 120 of device 100 and terminal 220 of provider subsystem 200 and/or as an online-based communication 672o between communications component 106 of device 100 and communications component 206 and server 210 of provider subsystem 200) for initiating a credential-based transaction between device 100 and provider subsystem 200. In some embodiments, provider communication initiation data 672 may be operative to notify device 100 of the one or more types of payment credentials that provider subsystem 200 may be enabled to process, such that device 100 may be operative to receive such a notification and to present the appropriate credentials of device 100 that may be suitable options for use with provider subsystem 200 to a user of device 100 at step 624 (e.g., using any suitable portion of one or more passes 119 with card management application 113b via I/O interface 114a as I/O output data 115o), as described with respect to FIGS. 8A-8D. For example, a provider subsystem 200 may be operative to contain a list of AIDs that may be assigned to one or more payment networks and/or issuing banks with which an acquiring bank subsystem 300 of provider subsystem 200 has an agreement to conduct commercial transactions and, thus, which provider subsystem 200 may support (e.g., terminal 220 may be operative to send a first list of AIDs as an NFC communication 5 that may be associated with one or more debit card scheme payment credentials (e.g., Interac) while provider subsystem 200 may be operative to send a second list of AIDs as an online communication 672o that may be associated with one or more credit card scheme payment credentials (e.g., Visa)). Therefore, in some embodiments, a portion of provider communication initiation data 672 may be operative to indicate one or more of such AIDs that may be supported by provider subsystem 200 for a particular communication situation with device 100 and such AIDs may be communicated by provider subsystem 200 to electronic device 100, where electronic device 100 may respond by providing options to a device user indicative of each pass 119 that may be associated with at least one AID that may match an AID supported by provider subsystem 200 at step 624.

If such a match exists, for example, as shown in FIG. 8A, GUI 180 may provide screen 190a, where a device application (e.g., card management application 113b and/or provider online resource application 113c) may be operative to present to a user the name of the provider (e.g., "Provider A") with information 807a, the name of the product (e.g., "Product B") with information 807b, the price (e.g., "Price C") with information 807c, and/or initial shipping data (e.g., "Address D") with information 807d. Provider communication initiation data 672 may be provided to device 100 by provider subsystem 200 that may be indicative of such information 807a, 807b, 807c, and/or 807d. Moreover, device 100 may be configured to provide screen 190a of GUI 180 of device 100 that may also include a purchase prompt 809 that may ask the user whether he or she wishes to make a purchase from the provider according to such details of provider communication initiation data 672. Moreover, as shown in FIG. 8A, screen 190a may prompt a user to interact with device 100 in one or more ways to choose a specific credential or pass that may be available to device 100 for making the purchase, for example, by including a credential selection prompt 811 that may enable a user to view information from any suitable number of passes 119 that may be on device 100 and that may be associated with at least one credential with an AID that is supported by provider subsystem 200 (e.g., based on information indicative of such AID support from provider communication initiation data 672). Prompt 811 may only include passes associated with credentials with AIDs that are associated with payment networks supported by the provider (e.g., as may be determined by provider communication initiation data 672, as mentioned above).

In one example, as shown, prompt 811 of FIG. 8A may be configured to include a first payment method as "Pass A", where such a pass may be pass 119a that may be associated with credential applet 153a and credential applet 153b as a pass representative of a multi-scheme payment card, and a second payment method as "Pass C", where such a pass may be pass 119c that may be associated with a single scheme payment card with an SSD (not shown). Such a first payment method of "Pass A" may be provided with two selectable pass portions, such as "Pass A (D)" portion 811d and "Pass A (O)" portion 811o, while such a second payment method of "Pass C" may only be provided with a single pass portion "Pass C" portion 811c. Selection of portion 811c may be operative to select the single credential that may be associated with Pass C that may be supported by provider subsystem 200, while selection of portion 811 d may be operative to select a default one of the many available credentials associated with Pass A that may be supported by provider subsystem 200, and while selection of portion 811o may be operative to enable a user to select from one of the many available credentials associated with Pass A that may be supported by provider subsystem 200. Selection of portion 811 d or 811 c may be operative to immediately select a particular credential associated with Pass A or Pass C, respectively. However, as shown by screen 190b of FIG. 8B, selection of portion 811o may be operative to provide a user with two or more options of two or more specific credentials that may be associated with Pass A that may be supported by provider subsystem 200. For example, as shown, portion 811o may enable a user to select from either credential 153a or credential 153b, each of which may be associated with pass 119a and each of which may be associated with a particular AID that may be supported by provider subsystem 200 (e.g., each one of AID 155a and AID 155b may be supported by provider subsystem 200). Therefore, interaction with single pass 119a via card management application 113b may enable a user to select a specific one of multiple credentials that may be represented by that single pass. As shown in FIG. 8B, credential 153a may be indicated by a "(D)" as the default credential for pass 119a in a given situation, yet the user may still be provided with an opportunity to select another credential associated with the same pass as credential 153*a*. In other embodiments (not shown), if provider subsystem 200 were only to support AID 155*a* of credential 153*a* but not AID 155*b* of credential 153*b*, then screen 190*a* may be operative to only include portion 811*d* but not portion 811*o* with respect to pass 119*a* as no choice between credentials 153*a* and 153*b* would be supported by provider subsystem 200. In yet other embodiments, the geographical location of device 100 (e.g., in Canada or outside of Canada) and/or the type of communication between device 100 and provider subsystem 200 (e.g., NFC communication 5 or online communication 672*o*) may be operative to at least partially dictate what options may be presented to a user with prompt 811 of FIG. 8A, if any options may be available at all. For example, certain credentials may not be made available for use by device 100 in certain geographical locations (e.g., a credential associated with an Interac debit system may not be operative to be selected by a user when device 100 is not located in Canada, yet another credential that may be associated with the same pass as such an Interac debit credential may be made available when device 100 is not located in Canada, such as a Visa global credit credential of the same multi-scheme payment card as the Interac debit credential). Additionally or alternatively, only certain credentials may be made available for use in online communications with provider subsystem 200 while others may only be enabled for use with local terminals 220.

While screen 190*a* of FIG. 8A and/or screen 190*b* FIG. 8B may prompt a user to interact with device 100 in one or more ways to choose a specific credential available to device 100 for making the purchase (e.g., through selection of credential 153*b* of Pass A of screen 190*b*), output display component 112*a* may be configured to provide screen 190*c* in response to receiving user selection of a credential from credential selection prompt 811*o* of screen 190*b* of FIG. 8B. Screen 190*c* of FIG. 8C may prompt a user to interact with device 100 in one or more ways to authenticate the user and its intent to utilize the selected credential (i.e., credential 153*b* of credential entry 813 of screen 190*c*). This may include prompting the user (e.g., with an authentication prompt 815) to enter user authentication via personal identification number ("PIN") entry or via user interaction with a biometric sensor in order to access the secure element of device 100 and, thus, the credential to be used for the purchase. As just one example, device 100 may be configured to determine intent and local authentication of a user of device 100 (e.g., via one or more input components 110, such as a biometric input component 110*i* of FIG. 3, as may be used by a user interacting with device 100) and, in response to such a determination, may be configured to enable or activate SSD 154*b* for conducting a payment transaction (e.g., with credential 153*b* of SSD 154*b*). In some embodiments, after such a determination, but before such enablement or activation, output display component 112*a* may be configured to provide screen 190*d* of FIG. 8D that may prompt a user (e.g., with a payment prompt 817) to interact with device 100 in one or more ways to finally initiate payment to provider subsystem 200 using the selected and authenticated credential.

Then, in response to a user selection of a particular one of the appropriate options (e.g., as I/O input data 115*i* via I/O interface 114*a* to card management application 113*b*) and/or an automatic selection by device 100 based on any suitable settings or configuration characteristics of one or more credentials and/or passes (e.g., based on analysis of provider communication initiation data 672 and/or geographic location of device 100 and/or communication type with provider subsystem 200 and/or pre-defined settings on device 100) at step 624, device 100 may be operative to generate and transmit activated credential data 676 (e.g., based on the selection at step 624) to provider subsystem 200 at step 626 (e.g., as other NFC communication 5 between NFC component 120 of device 100 and terminal 220 of provider subsystem 200 and/or as other online-based communication 672*o* between communications component 106 of device 100 and communications component 206 and server 210 of provider subsystem 200) for continuing with the credential-based transaction between device 100 and provider subsystem 200 (e.g., for attempting to fund the transaction). For example, based on a given situation and selection identified at step 624 (e.g., user selection or automatic device selection of a pass or of a particular credential associated with a pass, which may be enabled by utilizing link information (e.g., information indicative of whether two or more applets are associated with a particular multi-scheme card of the pass and/or whether an applet or associated applets may be enabled for choice or no choice)), device 100 may be operative to generate and transmit to provider subsystem 200 appropriate activated credential data 676 at step 626 that may be indicative of at least one activated credential applet associated with that selection of step 624 (e.g., actual and/or virtual credential data associated with at least one selected applet 153 of an SSD 154 of NFC component 120, which may include any suitable encrypted or other version of the PAN 159 of at least one of the selected applets and/or an AID 155 of each selected applet and/or any suitable token and/or certificate and/or the like of at least one, some, or each of the selected applets). Then, provider subsystem 200 may receive such activated credential data 676, and acquiring bank subsystem 300 may in turn receive and utilize such activated credential data 676 for authenticating the use of that commerce credential data and/or completing a financial transaction with issuer subsystem 350. For example, after a user of electronic device 100 has chosen a product for purchase and has selected a specific provisioned/enabled credential of device 100 to be used for payment, device 100 may be configured to transmit appropriate activated credential data 676 indicative of commerce credential data for the selected credential at step 626 of process 600 of FIG. 6, where provider subsystem 200 may be configured to receive activated credential data 676. In some embodiments, a user may be enabled to select a pass 119*a* that may be associated with multiple payment scheme credentials on device 100 (e.g., credential applets 153*a* and 153*b*) at step 624, and based on such a selection, information related to one, some, or each credential associated with that selected pass may be shared with provider subsystem 200. For example, in response to user selection of pass 119*a* that may be associated with a multi-scheme card represented by applets 153*a* and 153*b*, the AID of one, some, or each credential 153*a* and 153*b* of the selected multi-scheme card's pass 119*a* may be communicated to provider subsystem 200 at another communication instance of initiation data 672 at step 622, whereby provider subsystem 200 may determine which particular AID(s) of the received AIDs of that communication provider subsystem 200 may be configured to handle (e.g., AID 155*b* of credential applet 153*b* but not AID 155*a* of credential applet 153*a*) and provider subsystem 200 may then send command requests for payment credential information associated with that particular AID (e.g., at another communication instance of initiation data 672 at step 622) to device 100 such that device 100 may then generate activated credential data 676 that may include payment data for the credential associated with that particular AID (e.g., PAN 159*b* of credential 153*b* associated with the selected particular AID 155*b*).

Provider subsystem 200 may be provided by any suitable provider that may provide a product or service to a user of device 100 in response to device 100 providing payment credentials via activated credential data 676 (e.g., as NFC communication 5 and/or online-based communication 672*o*) to provider subsystem 200. Based on such received activated credential data 676, provider subsystem 200 (e.g., a provider processor that may act in accordance with a provider application) may be configured to generate and transmit (e.g., via provider communications component 206) provider authorization request data 678 to acquiring bank subsystem 300 (e.g., via a communication path 25 between provider subsystem 200 and acquiring bank subsystem 300) at step 628 of process 600 of FIG. 6, where provider authorization request data 678 may include payment information and an authorization request that may be indicative of the user's commerce credential (e.g., the PAN and/or the AID of an activated credential of activated credential data 676) and, potentially, the provider's purchase price for the product or service. Also known as a payment processor or acquirer, acquiring bank subsystem 300 may be a banking partner of the provider associated with provider subsystem 200, and acquiring bank subsystem 300 may be configured to work with issuer subsystem 350 to approve and settle credential transactions attempted by electronic device 100 via activated credential data 676 with provider subsystem 200. In response to receiving provider authorization request data 678 at step 628, acquiring bank subsystem 300 may then forward the authorization request from provider authorization request data 678 to issuer subsystem 350 as acquiring bank authorization request data 680 (e.g., via a communication path 35 between acquiring bank subsystem 300 and issuer subsystem 350) at step 630 of process 600 of FIG. 6, where acquiring bank authorization request data 680 may include payment information and an authorization request that may be indicative of the user's commerce credential (e.g., the PAN and/or the AID of an activated credential of activated credential data 676) and, potentially, the provider's purchase price for the product or service, and/or information indicative of the provider's bank account with acquiring bank subsystem 300. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

When issuer subsystem 350 receives an authorization request (e.g., from acquiring bank subsystem 300 as acquiring bank authorization request data 680), the payment information may be analyzed by issuer subsystem 350 at step 632 of process 600 of FIG. 6 to determine whether or not the identified commerce credential has been authenticated for use in a financial transaction. For example, if the commerce credential information of activated credential data 676 transmitted from device 100 and included in acquiring bank authorization request data 680 is indicative of a virtual credential (e.g., a D-PAN and/or a particular AID), issuer subsystem 350 may consult or otherwise leverage virtual-linking data structure 352 and/or structure 362 or any other suitable data to determine an appropriate link between the virtual credential and an associated actual credential (i.e., its associated F-PAN) before allowing the associated actual credential to be used during the attempted financial transaction (e.g., to actually fund the transaction). If at step 632 it is determined that a link between the virtual credential identified in an attempted financial transaction and an associated actual credential is authenticated, process 600 may jump to step 634, whereby that associated actual credential may be used to fund the financial transaction. However, if at step 632 it is determined that a link between the virtual credential identified in an attempted financial transaction and an associated actual credential is not authenticated, process 600 may attempt to appropriately authenticate that link in one or more suitable ways.

When issuer subsystem 350 identifies an authenticated link between a particular virtual credential (e.g., of acquiring bank authorization request data 680) and an associated actual credential (e.g., through leveraging data structure 352 and/or structure 362 at step 632), process 600 may proceed to step 634, whereby that associated actual credential may be used by issuer subsystem 350 to attempt to fund the requested financial transaction. For example, if issuer subsystem 350 may leverage table 352/362 to determine that the commerce credential information of activated credential data 676 between device 100 and provider terminal 220 is indicative of a virtual credential (e.g., a D-PAN and/or AID of data structure 352/362) that has an authenticated link to an actual credential (e.g., an associated F-PAN of data structure 352/362), then issuer subsystem 350 may determine at step 632 whether the account associated with that actual credential or F-PAN has enough funds/credit to cover the purchase amount of the attempted financial transaction (e.g., as may be identified by acquiring bank authorization request data 680). If sufficient funds are not present, issuer subsystem 350 may decline the requested transaction by transmitting negative acquiring bank authorization response data 684 to acquiring bank subsystem 300 at step 634. However, if sufficient funds are present, issuer subsystem 350 may approve the requested transaction by transmitting positive acquiring bank authorization response data 684 to acquiring bank subsystem 300 at step 634 and the financial transaction may be completed. Either type of authorization response may be provided by issuer subsystem 350 to acquiring bank subsystem 300 as authorization response data 684 (e.g., via communications path 35 using any suitable communications protocol) at step 634 of process 600 of FIG. 6 (e.g., in conjunction with an appropriate payment network subsystem (e.g., subsystem 360*a* or 360*b*) as may be identified by issuing bank subsystem 370 at step 632 (e.g., based on the D-PAN and/or AID and/or table 352/362)). Then, such authorization response data 684 may be utilized by acquiring bank subsystem 300 (e.g., to apply credit to the bank account of the provider of provider subsystem 200 at acquiring bank subsystem 300 with funds from the account associated with the actual commerce credential or F-PAN), and associated provider authorization response data 686 may be provided by acquiring bank subsystem 300 to provider subsystem 200 (e.g., via communications path 25) based on authorization response data 684 at step 636 of process 600 of FIG. 6, where any suitable device authorization response data 688 that may be indicative of the financial transaction may then be provided to device 100 (e.g., via provider subsystem 200) at step 638 (e.g., as NFC communication 5 and/or online-based communication 672*o*).

After a user of device 100 may provide intent and authentication to provision a multi-scheme card on device 100 (e.g., as request data 652 of step 602), remaining steps of process 600 may occur transparently to the user. That is, once the user provides suitable authenticated request data 652 to provision a multi-scheme card on device 100 at step 602, one or more of steps 604-620 may occur without any further user interaction and may seem instantaneous to a user, whereby process 600 may appear to a user as if, after step 602, a single pass or multiple passes 119 as well as multiple credential applets 153 may be automatically provisioned onto device 100. Therefore, multiple credential applets (e.g., multiple credentials of a multi-scheme card) may be provisioned on device 100 and linked with one another and one or more passes in response to a single card provisioning request. Once a first pass 119a associated with a first credential of a multi-scheme card has been provisioned on device 100 (e.g., based on pass data of first credential device data 662 at step 612), that pass may be presentable to a user such that the user may believe that the multi-scheme card has been fully provisioned on device 100 (e.g., despite an associated credential applet 153a still potentially needing to be enabled by notification data of first credential device data 662 at another portion of step 612 and/or despite a second credential of the same multi-scheme card still needing to be provisioned on device 100 at steps 614-620, which may result in at least a portion of that pass (e.g., link information 117a) being updated).

In some embodiments, each one of two or more linked credentials of a multi-scheme card on device 100 may include its own PAN that may be utilized for defining activated credential data 676 when that specific credential may be activated for use in a commercial transaction with provider subsystem 200. For example, as described above with respect to steps 602-620, a multi-scheme card may be provisioned on device 100 by provisioning first SSD 154a to include first credential applet 153a with a first AID 155a and a first PAN 159a and first link information (e.g., first link information 157a of SSD 154a and/or first link information as a portion of link information 157s) as well as by provisioning second SSD 154b to include second credential applet 153b with a second AID 155b and a second PAN 159b and second link information (e.g., second link information 157b of SSD 154b and/or second link information as a portion of link information 157s). In such embodiments, first AID 155a and second AID 155b may be different. Moreover, first PAN 159a and second PAN 159b may be different (e.g., each one of PANs 159a and 159h may be a distinct D-PAN that may be linked to the same F-PAN or different F-PANs by one or more of tables 352 and 362 (e.g., based on whether one or more funding accounts may be associated with the multiple payment scheme credentials of the multi-scheme card)). Alternatively, first PAN 159a and second PAN 159b may be the same (e.g., each one of PANs 159a and 159b may be the same D-PAN that may be linked to the same F-PAN or different F-PANs but with different AIDs (e.g., first AID 155a in combination with that singular D-PAN may be linked to a first F-PAN for applet 153a (e.g., by one or more of tables 352 and 362) and second AID 155b in combination with that singular D-PAN may be linked to that first F-PAN or a different second F-PAN for applet 153b (e.g., by one or more of tables 352 and 362))). Therefore, the AID of the applet to be used for funding a transaction may be provided as a portion of activated credential data 676 and may be used by provider subsystem 200, acquiring bank subsystem 300, and/or issuer subsystem 400 to identify the proper account for potentially funding the transaction. Thus, when it may be determined at step 624 to activate the first payment scheme credential of a provisioned multi-scheme card for use in a commercial transaction, PAN 159a and AID 155a of first credential SSD 154a may be utilized to generate activated credential data 676 at step 626 and, when it may be determined at step 624 to activate the second payment scheme credential of a provisioned multi-scheme card for use in a commercial transaction, PAN 159b and AID 155b of second credential SSD 154b may be utilized to generate activated credential data 676 at step 626. In such embodiments, the first credential applet 153a of the initially provisioned SSD 154a of such a provisioned multi-scheme payment card may be referred to as a primary instance of the multi-scheme payment card and the second credential applet 153b of the other provisioned SSD 154b of such a provisioned multi-scheme payment card (as well as any other additional credential applets of the multi-scheme card) may be referred to as an auxiliary instance of the multi-scheme payment card. Each primary instance and each auxiliary instance may include a unique AID in a unique SSD and a unique applet with a unique certificate, while each instance may or may not include a unique PAN.

In some embodiments, only one of two or more linked credentials of a multi-scheme card on device 100 may include its own PAN that may be utilized for defining activated credential data 676 when any specific credential of that multi-scheme card may be selected for use in a commercial transaction with provider subsystem 200. For example, while a first multi-scheme payment card may be provisioned on device 100 by provisioning first SSD 154a and second SSD 154b and linking applets 153a and 153b of such SSDs 154a and 154b to a first pass 119a (e.g., as described above with respect to a first iteration of steps 602-620), a second multi-scheme card may additionally or alternatively be provisioned on device 100 by provisioning third SSD 154c to include third credential applet 153c with a third AID 155c and a third PAN 159c and third link information (e.g., third link information 157c of SSD 154c and/or third link information as a portion of link information 157s) at another iteration of steps 602-612 as well as by provisioning fourth SSD 154d to include fourth credential applet 153d with a fourth AID 155d and fourth link information (e.g., fourth link information 157d of SSD 154d and/or fourth link information as a portion of link information 157s) at another iteration of steps 614-620, whereby the link information of third applet 153c and fourth applet 153d of such SSDs 154c and 154d may be operative to link such credentials to a second pass 119b with associated link information 117b for that second multi-scheme payment card. However, while many elements of a first iteration of steps 602-620 for provisioning applets 153a and 153b with pass 119a of the first multi-scheme payment card may be substantially similar to those elements of a second iteration of steps 602-620 for provisioning applets 153c and 153d with pass 119b of the second multi-scheme payment card, unlike the first iteration of steps 616-620 that may include provisioning SSD 154b to include PAN 159b, the second iteration of steps 616-620 may include provisioning SSD 154d without its own PAN. Instead, rather than provisioning a PAN onto SSD 154d at steps 616-620 (e.g., like PAN 159b of SSD 154b), steps 616-620 may provision any suitable content for SSD 154d that may be linked and used in conjunction with SSD 154c for later conducting a commercial transaction without using a PAN of SSD 154d when SSD 154d is selected for use in the transaction.

For example, link information 157d and link information 157c (or any suitable portion of link information 157s that may be related to SSDs 154c and 154d) may be operative to enable a shareable communication interface 147 between SSD 154*c* and SSD 154*d*. Shareable interface 147 may enable SSD 154*d* to forward any received commands (e.g., commands from provider subsystem 200 that may be addressed to SSD 154*d* with AID 155*d*) to an associated linked SSD 154*c* that may include a PAN and any other suitable data that may not be provided on SSD 154*d*. Shareable interface 147 may also enable SSD 154*c* to receive and process any such commands from SSD 154*d* and prepare and transmit any suitable response commands to SSD 154*d*, which may then be forwarded from SSD 154*d* to the appropriate target (e.g., provider subsystem 200 (e.g., via controller 142)). In such embodiments, the first credential applet 153*c* of the initially provisioned SSD 154*c* of such a provisioned multi-scheme payment card may be referred to as a main instance of the multi-scheme payment card and the second credential applet 153*d* of the other provisioned SSD 154*d* of such a provisioned multi-scheme payment card (as well as any other additional credential applets of the multi-scheme card) may be referred to as a proxy instance of the multi-scheme payment card. Any suitable multi-scheme properties or rules that may be determined by transaction entity subsystem 400 at step 604 may be leveraged to dictate when one instance of a multi-scheme card is to be provisioned as a main instance and when one or more other instances of that multi-scheme card is to be provisioned as one or more proxy instances. Proxy instances may require less processing resources and/or memory resources and/or any other suitable resources of secure element 145 than may other instances that may include a PAN and other suitable perso data (e.g., proxy instance 153*d* may require less secure element resources than auxiliary instance 153*b*). For example, proxy applet 153*d* may be substantially empty except for AID 155*d*, link information 157*d*, and limited processing capabilities for passing on data from controller 142 to main SSD 153*c* and vice versa (e.g., a proxy SSD may be operative to have an AID and to run code that may be operative to configure that proxy SSD as a pipe or tunnel between its linked main SSD and provider subsystem 200).

When provisioning a proxy instance associated with a main instance for a certain multi-scheme card, any suitable information related to the main instance previously provisioned on device 100 may be leveraged for provisioning the proxy instance for enabling shareable communication interface 147 and/or for enabling appropriate use and recognition of that proxy instance when selected for use in funding a commercial transaction. For example, at step 616 of process 600 of FIG. 6 for provisioning SSD 154*d*, issuer subsystem 350 may generate and transmit put pending command data as a portion of information 666 to transaction entity subsystem 400 (e.g., to SMP-TSM component 420 of transaction entity subsystem 400). In some embodiments, rather than such put pending command data including a primary account number (e.g., D-PAN or F-PAN, hashed or not) of the fourth payment scheme credential being provisioned, such put pending command data may include AID 155*d* for applet 153*d* of the data of the second payment scheme credential being provisioned at SSD 154*d*, an SSD identifier, and/or an SSD counter. Then, in response to receiving such put pending command data, transaction entity subsystem 400 (e.g., SMP-TSM component 420) may issue notification data as a portion of second credential device data 670 to device 100 at step 620 of process 600 of FIG. 6 based on such put pending command data of information 666. Such put pending command data and/or notification data may include AID 155*d* that may be associated with the payment scheme credential as well as link information 157*d* but may not include a usable PAN for provisioning on SSD 154*d* of device 100. Moreover, in some embodiments, table 352 that may be used for the provisioning of the first payment scheme credential at step 610 (e.g., for credential applet 153*c* to be linked with applet 153*d*) may be similarly used for the provisioning of the second payment scheme credential at step 618. Alternatively, in other embodiments, distinct second table 362 may be utilized for the provisioning of the second payment scheme credential at step 618 (e.g., where the different tables may be associated with different payment networks or just utilized at different suitable times by a single component of issuer subsystem 350). When the second payment scheme credential is not to include a PAN, step 618 may include associating the AID of that second credential (e.g., AID 155*d*) with any other suitable PAN (e.g., the PAN 159*c* of a linked and earlier provisioned main credential of the same multi-scheme card) such that later receipt of such an AID 155*d* of the proxy instance (e.g., as a portion of activated credential data 676) may be utilized (e.g., alone or in combination with a PAN or other suitable data of activated credential data 676) to identify an appropriate F-PAN for funding a transaction. For example, after third SSD 154*c* has been provisioned with AID 155*c* and PAN 159*c* and link information 157*c* (e.g., for association with pass 119*b*) at steps 606-612, any suitable data associated with that third SSD 154*c* may be communicated as at least a portion of credential provisioning information 666 from transaction entity subsystem 400 to issuer subsystem 350 for associating that third SSD 154*c* with the new fourth SSD 154*d* to be provisioned at steps 616-620. For example, information 666 may include information indicative of AID 155*c* and/or PAN 159*c*, such that issuer subsystem 350 may utilize that information when generating credential provisioning response data and/or put pending command data of information 666 for communication back to transaction entity subsystem 400 for use in provisioning fourth SSD 154*d*. For example, issuer subsystem 350 may leverage such information indicative of AID 155*c* and/or PAN 159*c* to associate new AID 155*d* for new SSD 154*d* with that AID 155*c* and/or PAN 159*c* at issuer subsystem 350 (e.g., at step 618 with one or more tables, such as table 352 and/or table 362 and/or table 382), such that in the event that SSD 154*d* may utilize AID 155*d* to generate and transmit activated credential data 676 for using SSD 154*d* to conduct a commercial transaction, issuer subsystem 350 may be operative to utilize that AID 155*d* to determine the appropriate way to fund the transaction. Therefore, when it may be determined at step 624 to activate the first payment scheme credential of a such provisioned multi-scheme card for use in a commercial transaction, PAN 159*c* of credential SSD 154*c* may be utilized (e.g., with AID 155*c*) to generate activated credential data 676 at step 626 and, when it may be determined at step 624 to activate the second payment scheme credential of a such provisioned multi-scheme card for use in a commercial transaction, while no PAN of credential SSD 154*d* may be available, AID 155*d* may be utilized (e.g., with PAN 159*c*) to generate activated credential data 676 at step 626 (e.g., as described below with respect to process 700 of FIG. 7). While PAN 159*c* of applet 153*c* may be a D-PAN that may be linked in combination with AID 155*c* to a first F-PAN by issuer subsystem 350 (e.g., in any suitable table (e.g., table 352)) at step 610 for main SSD 154*c* such that the first F-PAN may be later identified for funding a transaction in response to activated credential data 676 being generated based on selection of the credential of main SSD 154*c*, AID 155*d* of applet 153*d* may be linked (e.g., in combination with PAN 159*c*) to either that same first F-PAN or to a different second F-PAN by issuer subsystem 350 (e.g., in any suitable table (e.g., table 352)) at step 618 for proxy SSD 154d (e.g., depending on the type of multi-scheme card or other characteristics that may be determined by transaction entity subsystem 400 and/or issuer subsystem 350 or otherwise) such that F-PAN may be later identified for funding a transaction in response to activated credential data 676 being generated based on selection of the credential of proxy SSD 154d.

In some embodiments, a main credential applet instance and a proxy credential applet instance may be linked to a single pass (e.g., main applet 153c and proxy applet 153d may be linked to single pass 119b). However, in other embodiments, a main credential applet instance and a proxy credential applet instance may be linked to different passes (e.g., main applet 153c may be linked to a pass 119c (e.g., via link information 117c and link information 157c) while proxy applet 153d may be linked to a pass 119d (e.g., via link information 117d and link information 157d)), such that a user may be enabled to interact with and select between two distinct passes when appropriate to select between using the main instance and the proxy instance for a commercial transaction. However, in such embodiments, the main instance and the proxy instance may still be linked with one another (e.g., via link information 157c and 157d) such that a shareable interface (e.g., interface 147) may still be enabled for communicating PAN information of the main instance along with AID information of a selected proxy instance for utilizing a selected proxy instance in a commercial transaction.

It is understood that the steps shown in process 600 of FIG. 6 are only illustrative and that existing steps may be modified or omitted, additional steps may be added, and the order of certain steps may be altered.

Description of FIG. 7

FIG. 7 is a flowchart of an illustrative process 700 for using a proxy credential app let on an electronic device in a commercial transaction. Process 700 is shown being implemented by electronic device 100, provider subsystem 200, acquiring bank subsystem 300, and issuer subsystem 350. However, it is to be understood that process 700 may be implemented using any other suitable components or subsystems. Process 700 may provide a seamless user experience for using a proxy credential applet of a multi-scheme payment card provisioned on device 100 for conducting a transaction (e.g., with provider subsystem 200). Process 700 may begin at step 702, where, once each of a main credential and one or more proxy credentials of a multi-scheme card have been provisioned and enabled on device 100 as main SSD 154c and proxy SSD 154d as described above with respect to certain iterations of steps 602-620 of process 600, provider communication initiation data 752 may be communicated between electronic device 100 and provider subsystem 200 (e.g., as an NFC communication 5 between NFC component 120 of device 100 and terminal 220 of provider subsystem 200 and/or as an online-based communication 672o between communications component 106 of device 100 and communications component 206 and server 210 of provider subsystem 200) for initiating a credential-based transaction between device 100 and provider subsystem 200 (e.g., similarly to step 622 of process 600). In some embodiments, provider communication initiation data 752 may be operative to notify device 100 of the one or more types of payment credentials that provider subsystem 200 may be enabled to process, such that device 100 may be operative to receive such a notification and to present the appropriate credentials of device 100 that may be suitable options for use with provider subsystem 200 to a user of device 100 at step 704 (e.g., using any suitable portion of one or more passes 119 with card management application 113b via I/O interface 114a as I/O output data 115o) (e.g., similarly to step 624 of process 600). Additionally or alternatively, device 100 may be operative to determine which credentials to present for use at least partially based on any suitable commands that may be determined from flags or other information of the provisioned credential data (e.g., "user choice" or "no user choice" information). Then, in response to a user selection of a particular one of the appropriate options (e.g., as I/O input data 115i via I/O interface 114a to card management application 113b) and/or as an automatic selection by device 100 based on any suitable settings or configuration characteristics of one or more credentials and/or passes (e.g., based on analysis of provider communication initiation data 752) at step 704, device 100 may be operative to generate and transmit activated credential data 766 to provider subsystem 200 at step 716 (e.g., as other NFC communication 5 between NFC component 120 of device 100 and terminal 220 of provider subsystem 200 and/or as other online-based communication 672o between communications component 106 of device 100 and communications component 206 and server 210 of provider subsystem 200) for continuing with the credential-based transaction between device 100 and provider subsystem 200 (e.g., for attempting to fund the transaction) (e.g., similarly to step 626 of process 600).

For example, as described with respect to data 676 of process 600, device 100 may be operative to generate and transmit activated credential data 766 to provider subsystem 200 at step 716 that may include any suitable information associated with a credential selected at step 704 that may be operative to identify a suitable funding account of issuer subsystem 350 for funding the credential-based transaction between device 100 and provider subsystem 200. As described above with respect to activated credential data 676 that may be generated at step 626 based on a selection at step 624 of either primary SSD 154a or auxiliary SSD 154b of a first multi-scheme card provisioned on device 100, such activated credential data 676 may include information indicative of the PAN of that selected credential SSD (e.g., PAN 159a of SSD 154a or PAN 159b of SSD 154b). Similarly, with respect to a selection of main SSD 154c being determined at step 704, activated credential data 766 may include information indicative of the PAN of that selected credential SSD (e.g., PAN 159c of SSD 154c). However, when a selection of a proxy SSD 154d without a PAN may be determined at step 704, activated credential data 766 may be generated to include any other suitable information that may be utilized by issuer subsystem 350 for appropriately funding the credential-based transaction between device 100 and provider subsystem 200 according to that selected proxy SSD 154d.

When a proxy instance of SSD 154d may be selected at step 704 in any suitable manner for use in generating activated credential data 766 (e.g., based on active user selection of a pass associated with that proxy and/or based on provider subsystem 200 being operative to transact with AID 155d of that proxy and/or based on an automatic selection of SSD 154d and/or applet 153d by device 100), proxy SSD 154d may be operative to receive suitable controller command data 756 at step 706 that may be indicative of such a selection (e.g., data that may be operative to instruct an SSD to generate payment information for use in a commercial transaction as a portion of data 766).

Controller command data 756 may be received by proxy SSD 154*d* from provider subsystem 200 via NFC controller 142, where such a command may be addressed to or otherwise associated with the instance associated with unique AID 155*d* of proxy SSD 154*d*. In response to receipt of such command data 756, proxy SSD 154*d* may be operative to forward at least a portion of controller command data 756 to a main SSD associated with proxy SSD 154*d* (e.g., main SSD 154*c*, as may be identified via link information 157*d* and/or link information 157*s*) via a shareable interface 147 as proxy command data 758 at step 708. Such proxy command data 758 may include AID 155*d* and/or any other suitable information indicative of proxy SSD 154*d* as the source of such data 758 and/or any suitable information indicative of a selection to generate activated credential data (e.g., based on controller command data 756). Such proxy command data 758 may include an instruction for the target SSD (e.g., main SSD 154*c*) to generate any suitable payment information for use in a commercial transaction. Next, at step 710, in response to such proxy command data 758, main SSD 154*c* may be operative to process such proxy command data 758 and to generate suitable main response data 762 for transmission back to proxy SSD 154*d* at step 712 (e.g., via shareable interface 147). For example, at step 710, main SSD 154*c* may be operative to process data 758 in any suitable way (e.g., using processing code of SSD 154*c*) to determine whether command data 758 has been issued by controller 142 (e.g., as controller command data directed specifically for main SSD 154*c* from controller 142) or by a proxy SSD and to respond accordingly. For example, at step 710, main SSD 154*c* may determine that command data 758 is indeed from proxy SSD 154*d* and may generate main response data 762 that may include at least a portion of information representative of PAN 159*c* of SSD 154*c* along with any suitable information indicative of the fact that response data 762 was generated in response to a command from proxy SSD 154*d* (e.g., by including at least a portion of information representative of AID 155*d* of SSD 154*d* in response data 762 with or without any information representative of AID 155*c*). Next, at step 714, proxy SSD 154*d* may receive such main response data 762 (e.g., via interface 147) and may pass such data on as proxy response data 764 at step 714 to controller 142, which may pass such response data on as activated credential data 766 at step 716 to provider subsystem 200 (e.g., as NFC communication 5 between NFC component 120 of device 100 and terminal 220 of provider subsystem 200 and/or as other online-based communication 672*o* between communications component 106 of device 100 and communications component 206 and server 210 of provider subsystem 200).

Based on such received activated credential data 766, provider subsystem 200 (e.g., a provider processor that may act in accordance with a provider application) may be configured to generate and transmit (e.g., via provider communications component 206) provider authorization request data 768 to acquiring bank subsystem 300 (e.g., via a communication path 25 between provider subsystem 200 and acquiring bank subsystem 300) at step 718 of process 700 of FIG. 7, where provider authorization request data 768 may include payment information and an authorization request that may be indicative of the user's commerce credential (e.g., the PAN and/or the AID of activated credential data 766 (e.g., AID 155*d* of the selected proxy SSD 154*d* and/or PAN 159*c* of its associated main SSD 154*c*)) and, potentially, the provider's purchase price for the product or service. In response to receiving provider authorization request data 768 at step 718, acquiring bank subsystem 300 may then forward the authorization request from provider authorization request data 768 to issuer subsystem 350 as acquiring bank authorization request data 770 (e.g., via a communication path 35 between acquiring bank subsystem 300 and issuer subsystem 350) at step 720 of process 700 of FIG. 7, where acquiring bank authorization request data 770 may include payment information and an authorization request that may be indicative of the user's commerce credential (e.g., AID 155*d* of the selected proxy SSD 154*d* and/or PAN 159*c* of its associated main SSD 154*c*) and, potentially, the provider's purchase price for the product or service, and/or information indicative of the provider's bank account with acquiring bank subsystem 300.

When issuer subsystem 350 receives an authorization request (e.g., from acquiring bank subsystem 300 as acquiring bank authorization request data 770), the payment information may be analyzed by issuer subsystem 350 at step 722 of process 700 of FIG. 7 to determine whether or not the identified commerce credential has been authenticated for use in a financial transaction. For example, if the commerce credential information of activated credential data 766 transmitted from device 100 and included in acquiring bank authorization request data 770 is indicative of a virtual credential (e.g., a D-PAN), issuer subsystem 350 may consult or otherwise leverage virtual-linking data structure or table 352 and/or table 362 and/or table 382 or any other suitable data to determine an appropriate link between the virtual credential and an associated actual credential (i.e., its associated F-PAN) before allowing the associated actual credential to be used during the attempted financial transaction (e.g., to actually fund the transaction). For example, when request data 770 may include AID 155*d* of selected proxy SSD 154*d* and PAN 159*c* of its associated main SSD 154*c*, issuer subsystem 350 may be operative to determine a particular F-PAN that may be associated with both PAN 159*c* and AID 155*d*, where such an F-PAN may be the same as or different than an F-PAN that be associated with both PAN 159*c* and AID 155*c* (e.g., such a PAN/AID combination that might be generated by device 100 as credential data 766 if main SSD 154*c* were selected for use in the commercial transaction (e.g., at step 704)). For example, during provisioning of proxy SSD 154*d* at steps 614-620 of process 600 after provisioning of main SSD 154*c* at steps 604-612 of process 600, step 618 may include issuer subsystem 350 generating an association between PAN 159*c* of the previously provisioned main SSD 154*c* and the AID 155*d* of the proxy SSD 154*d* currently being provisioned and associating such a PAN/AID association with a particular funding account (e.g., the same F-PAN with which D-PAN 159*c* may have been associated at step 610 during provisioning of SSD 154*c* and/or another F-PAN with which the second payment scheme credential being provisioned as proxy SSD 154*d* may be uniquely associated with). Therefore, by incorporating any suitable breadcrumbs or other data types that may be operative to identify not only main SSD 154*c* (e.g., by PAN 159*c* or any other suitable information that may be provided by SSD 154*c* (e.g., at step 712) but also proxy SSD 154*d* (e.g., AID 155*d* or any other suitable information) within data 766 and thus data 770 that may be provided to issuer subsystem 350 when proxy SSD 154*d* may be selected for use in a commercial transaction, issuer subsystem 350 may be operative to analyze such data at step 722 to enable issuer subsystem 350 to identify the proper F-PAN to fund the commercial transaction without having to provision a unique D-PAN for proxy SSD 154*d* on device 100.

In some embodiments, device 100 may be configured not to enable a user to choose between using the credential of a main SSD and the credential of a proxy SSD of a main/proxy multi-scheme card (e.g., at step 704), for example, based on certain data that may be provided on device 100 during provisioning of the credentials of that card (e.g., based on the status of one or more particular flags or registers). If choice is allowed and a user selects the credential of main SSD 154c of the main/proxy multi-scheme card (e.g., at step 704), then activated credential data 766 may include at least PAN 159c and AID 155c of that selected main SSD 154c, which may be received and used by provider subsystem 200, acquiring bank subsystem 300, and issuer subsystem 350 to identify the proper funding account F-PAN associated with the credential of main SSD 154c for funding the transaction. If choice is allowed and a user selects the credential of proxy SSD 154d of the main/proxy multi-scheme card (e.g., at step 704), then activated credential data 766 may include at least PAN 159c of main SSD 154c and AID 155d of that selected proxy SSD 154d, which may be received and used by provider subsystem 200, acquiring bank subsystem 300, and issuer subsystem 350 to identify the proper funding account F-PAN associated with the credential of proxy SSD 154d for funding the transaction. However, if choice is not allowed and the main/proxy multi-scheme card with which main SSD 154c and proxy SSD 154d are associated is selected (e.g., at step 704), then activated credential data 766 may include at least PAN 159c and AID 155c of main SSD 154c and AID 155d of proxy SSD 154d, which may be received and used by provider subsystem 200, acquiring bank subsystem 300, and issuer subsystem 350 to identify the proper funding account F-PAN associated with the credential of either main SSD 154c or proxy SSD 154d for funding the transaction (e.g., provider subsystem 200 may determine that the main SSD ought to be used and may forward PAN 159c with or without AID 155c of main SSD 154c to an appropriate financial subsystem associated with main AID 155c (e.g., to a particular payment network that may be associated with that AID)). Alternatively, if choice is allowed and a user selects the credential of primary SSD 154a of a primary/auxiliary multi-scheme card (e.g., at step 624), then activated credential data 676 may include at least PAN 159a and AID 155a of that selected primary SSD 154a, which may be received and used by provider subsystem 200, acquiring bank subsystem 300, and issuer subsystem 350 to identify the proper funding account F-PAN associated with the credential of primary SSD 154a for funding the transaction. If choice is allowed and a user selects the credential of auxiliary SSD 154b of the primary/auxiliary multi-scheme card (e.g., at step 624), then activated credential data 676 may include at least PAN 159b and AID 155b of that selected auxiliary SSD 154b, which may be received and used by provider subsystem 200, acquiring bank subsystem 300, and issuer subsystem 350 to identify the proper funding account F-PAN associated with the credential of auxiliary SSD 154b for funding the transaction. However, if choice is not allowed and the primary/auxiliary multi-scheme card with which primary SSD 154a and auxiliary SSD 154b are associated is selected (e.g., at step 624), then activated credential data 676 may include at least PAN 159a and AID 155a of primary SSD 154a and PAN 159b and AID 155b of auxiliary SSD 154b, which may be received and used by provider subsystem 200, acquiring bank subsystem 300, and issuer subsystem 350 to identify the proper funding account F-PAN associated with the credential of either primary SSD 154a or auxiliary SSD 154b for funding the transaction (e.g., provider subsystem 200 may determine that the primary SSD ought to be used and may forward PAN 159a with or without AID 155a of primary SSD 154a to an appropriate financial subsystem associated with primary AID 155a (e.g., to a particular payment network that may be associated with that AID)).

If at step 722 it is determined that a link between the virtual credential identified in an attempted financial transaction and an associated actual credential is authenticated, process 700 may jump to step 724, whereby that associated actual credential may be used to fund the financial transaction. However, if at step 722 it is determined that a link between the virtual credential identified in an attempted financial transaction and an associated actual credential is not authenticated, process 700 may attempt to appropriately authenticate that link in one or more suitable ways. When issuer subsystem 350 identifies an authenticated link between a particular virtual credential (e.g., of acquiring bank authorization request data 770) and an associated actual credential (e.g., through leveraging data structure 352 and/or structure 362 and/or structure 382 at step 722), process 700 may proceed to step 724, whereby that associated actual credential may be used by issuer subsystem 350 to attempt to fund the requested financial transaction. For example, if issuer subsystem 350 may leverage table 352/362/382 to determine that the commerce credential information of activated credential data 766 between device 100 and provider terminal 220 is indicative of a virtual credential (e.g., a D-PAN with or without an associated AID of data structure 352/362/382) that has an authenticated link to an actual credential (e.g., an associated F-PAN of data structure 352/362/382), then issuer subsystem 350 may determine at step 722 whether the account associated with that actual credential or F-PAN has enough funds/credit to cover the purchase amount of the attempted financial transaction (e.g., as may be identified by acquiring bank authorization request data 770). If sufficient funds are not present, issuer subsystem 350 may decline the requested transaction by transmitting negative acquiring bank authorization response data 774 to acquiring bank subsystem 300 at step 724. However, if sufficient funds are present, issuer subsystem 350 may approve the requested transaction by transmitting positive acquiring bank authorization response data 774 to acquiring bank subsystem 300 at step 724 and the financial transaction may be completed. Either type of authorization response may be provided by issuer subsystem 350 to acquiring bank subsystem 300 as authorization response data 774 (e.g., via communications path 35 using any suitable communications protocol) at step 724 of process 700 of FIG. 7. Then, such authorization response data 774 may be utilized by acquiring bank subsystem 300 (e.g., to apply credit to the bank account of the provider of provider subsystem 200 at acquiring bank subsystem 300 with funds from the account associated with the actual commerce credential or F-PAN), and associated provider authorization response data 776 may be provided by acquiring bank subsystem 300 to provider subsystem 200 (e.g., via communications path 25) based on authorization response data 774 at step 726 of process 700 of FIG. 7, where any suitable device authorization response data 778 that may be indicative of the financial transaction may then be provided to device 100 via provider subsystem 200 at step 728 (e.g., as NFC communication 5 and/or online-based communication 672o).

Therefore, system 1 may be operative to provision, use, and manage the life cycle of multiple credentials of a single multi-scheme payment card that are to be represented on a secure element of electronic device 100 (e.g., by one or more applet instances). In some embodiments, multiple different credentials on a secure element may be represented under a single pass of a card management application (e.g., applets 153*a* and 153*b* may be represented under a single pass 119*a*). In some embodiments, when a single pass may be activated for use in a commercial transaction (e.g., selected by a user or automatically at step 624/704), data from each one of multiple applets associated with that pass may be activated at the same time (e.g., the AID of each applet associated with a selected pass may be advertised (e.g., as an iteration of provider communication initiation data 672/752 and/or as a portion of activated credential data 676/766). For example, both a main instance and an associated proxy instance may be instantiated and the AID of each may be communicated to provider subsystem 200 along with the PAN of the main instance, where the proxy instance may be a duplicate of and/or may refer back to its associated main instance but may have a different MD, and where the AID of the instance that may be supported or otherwise selected by the provider subsystem may be the AID that may drive the payment processing (e.g., along with the PAN of the main instance). This may enable a user of device 100 to not have to worry about which credential of multiple credentials associated with a single multi-payment scheme card represented by a user-selected pass may be activated and/or accepted for use by provider subsystem 200. As another example, both a primary instance and an associated auxiliary instance may be instantiated and the AID of each instance may be communicated to provider subsystem 200 along with the PAN of each instance, where the AID of the instance that may be supported or otherwise selected by the provider subsystem may be the AID that may drive the payment processing (e.g., along with the PAN of the instance associated with that AID), which may enable a user of device 100 to not have to worry about which credential of multiple credentials associated with a single multi-payment scheme card represented by a user-selected pass may be activated and/or accepted for use by provider subsystem 200.

By creating a pass that may be provided with link information that may associate the pass with two or more credentials on a secure element, and by provisioning two or more credentials on a secure element with link information that may associate each credential with the other and/or with a single particular pass, both a card management application (e.g., via link information of a pass and/or via link information provided by the secure element) and a secure element (e.g., via link information of two or more credentials and/or via link information provided by the card management application) may each be aware of the multi-scheme payment card solution provided on the user device. Such link information may be configured to be utilized by device 100 (e.g., with or without other additional information, such as device location information and/or information received from a provider subsystem) to determine whether a user may be provided with a choice as to which one of the different multiple credentials of a multi-scheme card the user would like to select for use in generating activated credential data for a particular transaction or whether a particular one, some, or all of the different multiple credentials of a multi-scheme card may be automatically used for generating activated credential data for a particular transaction, such that a user may or may not be provided with such a choice (e.g., a card management application and a secure element may be made independently aware of whether or not a user choice may be supported for a particular multi-scheme payment card provisioned on the user device).

A determination of whether a particular multi-scheme payment card provisioned on the user device may be operative to support user choice may be made by transaction entity subsystem 400 and/or issuer subsystem 350 (e.g., prior to provisioning of the card (e.g., at step 604 and/or step 608 and/or step 612 and/or step 616 and/or step 620) based on any suitable regulations or preferences of issuer subsystem 350 and/or transaction entity subsystem 400 or otherwise and/or any other suitable data that may be available for use in making such a determination (e.g., the type or capabilities or location of device 100 to which the card is being provisioned). Such a determination may be identified by certain portions of link information 117 provisioned on the pass 119 on host processor 102 with card management application 113*b* and/or by certain portions of link information 157 provisioned on the secure element and/or by a combination thereof. For example, when transaction entity subsystem 400 installs applets 153*a* and 153*b* on secure element 145 during provisioning of a multi-scheme payment card, transaction entity subsystem 400 may be operative to raise one or more suitable flags (e.g., set one or more registers) of the secure element (e.g., as a portion of link information 157 of a particular applet or of CRS 151 or otherwise) during provisioning of each applet or otherwise to indicate whether an applet is part of a pass of a single- or multi-scheme payment card (e.g., based on status of a first flag associated with that applet) and to indicate whether the applet may be operative with "user choice" or "no user choice" capabilities (e.g., based on status of a second flag associated with the applet). For example, with respect to FIG. 8A, "no user choice" for pass A may prevent any (D) or (O) options from being presented for user selection and instead may allow selection of pass A generally. Such flags may be advertised by secure element 145 to processor 102 such that processor 102 may be operative to utilize certain commands for activation of one or more credential instances associated with a pass of processor 102, such as a set standard local command that may be operative to activate only one AID of one credential associated with the multi-scheme payment card of the pass even if all AIDs of all credentials may be part of the pass (e.g., for enabling a user choice of just that one credential), and/or such as a set standard global command that may be operative to activate all AIDs of all credentials associated with the multi-scheme payment card (e.g., for enabling no user choice, such that all credentials may be made available to provider subsystem 200, whereby provider subsystem 200 may be operative to support or otherwise utilize a particular one of such credentials in a commercial transaction). Such commands may be an extension to a GlobalPlatform framework (e.g., GlobalPlatform's Application Groups), such as through the use of new sub-parameters and/or new APDU commands and/or new certificates (e.g., bitmap certificates) or variations of existing certificates (e.g., while maintaining their values) to ensure that secure element 145 may be configured with the flexibility to be operative to support the various uses cases of a multi-scheme payment card described herein. Alternatively, such one or more flags may be raised (e.g., one or more registers set) at processor 102 (e.g., as a portion of link information 117 of a particular pass or otherwise) during provisioning of the pass or otherwise such that processor 102 may be operative to utilize certain commands for activation. Therefore, link information (e.g., link information 117 and/or link information 157) may be generated and provided onto device 100 by transaction entity subsystem 350 and/or issuer subsystem 400 as a portion of credential device data during provisioning of one or more credentials (e.g., one or more applets and one or more passes) on device 100, where such link information may be operative to enable device 100 to determine whether two or more applets are associated with one another and/or with a particular pass and/or to determine whether a user or the device itself may be operative to choose a particular one of two or more associated applets for use in attempting to fund a transaction (e.g., in activated credential data when the multi-scheme card for which the applets are associated is configured to have choice) or whether all associated applets must be used in an attempt to fund a transaction (e.g., in activated credential data when the multi-scheme card for which the applets are associated is configured to have no choice).

It is understood that the steps shown in process 700 of FIG. 7 are only illustrative and that existing steps may be modified or omitted, additional steps may be added, and the order of certain steps may be altered.

Description of FIG. 9

FIG. 9 is a flowchart of an illustrative process 900 for providing a multi-scheme card on an electronic device that includes a secure element. A transaction entity subsystem and an issuer subsystem can be used to provide the multi-scheme card on the device. At step 902 of process 900, the transaction entity subsystem may receive from the electronic device, credential provisioning request data that may include request PAN information indicative of a request PAN of the multi-scheme card (e.g., provisioning request data 652 of step 602 of process 600 of FIG. 6 may include information indicative of a PAN of a multi-scheme card to be provisioned on device 100 and may be communicated to transaction entity subsystem 400). At step 904 of process 900, the transaction entity subsystem may identify a plurality of credentials associated with the request PAN information of the received credential provisioning request data (e.g., at step 604 of process 600 of FIG. 6, transaction entity subsystem 400 may use provisioning request data 652 and any other suitable data (e.g., table 482) to identify at least two credentials that may be associated with a PAN of provisioning request data 652). At step 906 of process 900, the transaction entity subsystem may acquire from the issuer subsystem, first credential provisioning information for a first credential of the identified plurality of credentials (e.g., at step 608 of process 600, transaction entity subsystem 400 may acquire credential provisioning information 658 for a first credential of a multi-scheme card). At step 908 of process 900, the transaction entity subsystem may acquire from the issuer subsystem, second credential provisioning information for a second credential of the identified plurality of credentials (e.g., at step 616 of process 600, transaction entity subsystem 400 may acquire credential provisioning information 666 for a second credential of a multi-scheme card). At step 910 of process 900, credential data may be provisioned on the electronic device based on the acquired first credential provisioning information and the acquired second credential provisioning information, wherein the provisioning the credential data may include storing, on the secure element of the electronic device, a first applet including a first PAN and a first application identifier ("AID") associated with the first credential, storing, on the secure element of the electronic device, a second applet including a second AID associated with the second credential, and storing, on the electronic device, link information operative to associate the first applet with the second applet (e.g., at step 612 and step 620 of process 600, transaction entity subsystem 400 may provision first credential device data 662 and second credential device data 670 on electronic device 100, which may include either primary applet 153*a* being stored on secure element 145 with PAN 159*a* and AID 155*a* and auxiliary applet 153*b* being stored on secure element 145 with AID 155*b* or main applet 153*c* being stored on secure element 145 with PAN 159*c* and AID 155*c* and proxy applet 153*d* being stored on secure element 145 with AID 155*d*, along with any suitable link information 117 and/or link information 157 that may be operative to associate the two stored applets).

It is understood that the steps shown in process 900 of FIG. 9 are only illustrative and that existing steps may be modified or omitted, additional steps may be added, and the order of certain steps may be altered.

Figure 10:
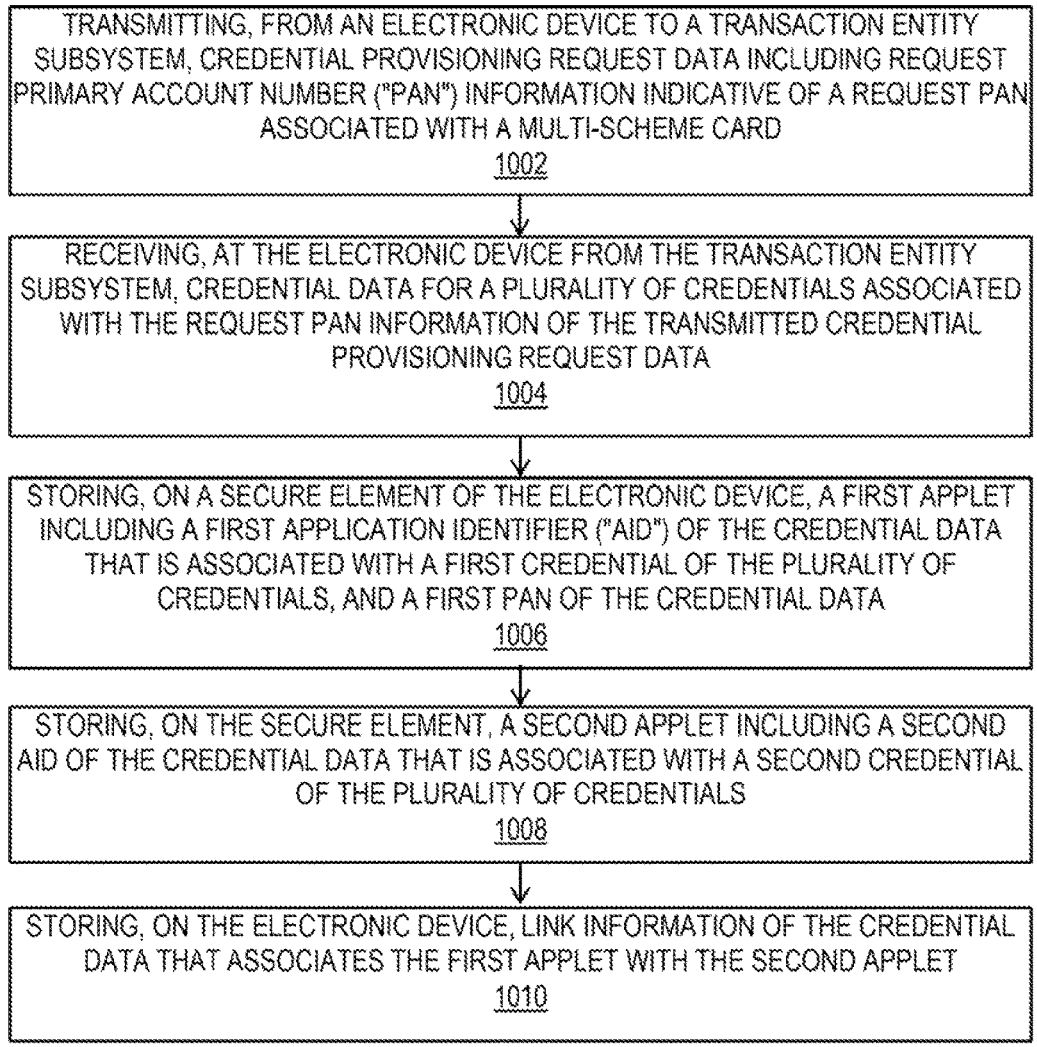

Description of FIG. 10

FIG. 10 is a flowchart of an illustrative process 1000 for providing a multi-scheme card on an electronic device that includes a secure element (e.g., using a transaction entity subsystem). At step 1002 of process 1000, the electronic device may transmit to the transaction entity subsystem, credential provisioning request data including request primary account number ("PAN") information indicative of a request PAN of a multi-scheme card (e.g., provisioning request data 652 of step 602 of process 600 of FIG. 6 may include information indicative of a PAN of a multi-scheme card to be provisioned on device 100 and may be communicated from device 100 to transaction entity subsystem 400). At step 1004 of process 1000, the electronic device may receive from the transaction entity subsystem, credential data for a plurality of credentials associated with the request PAN information of the transmitted credential provisioning request data (e.g., at step 612 and step 620 of process 600, transaction entity subsystem 400 may provision first credential device data 662 and second credential device data 670 on electronic device 100 that may include credential data for first and second credentials associated with the information indicative of a PAN of provisioning request data 652). At step 1006 of process 1000, the secure element of the electronic device may store a first applet including a first application identifier ("AID") of the credential data that is associated with a first credential of the plurality of credentials and a first PAN of the credential data (e.g., at step 612 of process 600, at least a portion of first credential device data 662 being received at device 100 may result in either primary applet 153*a* being stored on secure element 145 with PAN 159*a* and AID 155*a* or main applet 153*c* being stored on secure element 145 with PAN 159*c* and AID 155*c*). At step 1008 of process 1000, the secure element of the electronic device may store a second applet including a second AID of the credential data that is associated with a second credential of the plurality of credentials (e.g., at step 620 of process 600, at least a portion of second credential device data 670 being received at device 100 may result in either auxiliary applet 153*b* being stored on secure element 145 with AID 155*b* or proxy applet 153*d* being stored on secure element 145 with AID 155*d*). At step 1010 of process 1000, the electronic device may store link information of the credential data that associates the first applet with the second applet (e.g., at step 612 and/or step 620 of process 600, at least a portion of first credential device data 662 and/or at least a portion of second credential device data 670 being received at device 100 may result in any suitable link information 117 and/or link information 157 being stored on device 100 that may be operative to associate the two stored applets).

Figure 11:
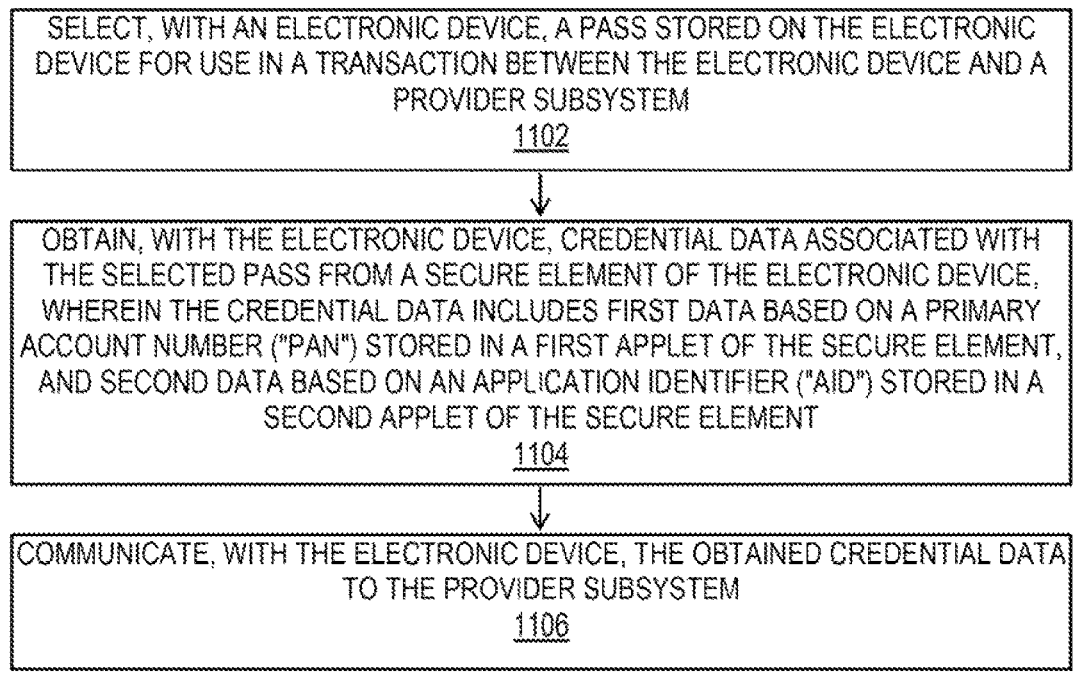

It is understood that the steps shown in process 1000 of FIG. 10 are only illustrative and that existing steps may be modified or omitted, additional steps may be added, and the order of certain steps may be altered.

Description of FIG. 11

FIG. 11 is a flowchart of an illustrative process 1100 for using a pass on an electronic device in a transaction with a provider subsystem. At step 1102 of process 1100, the electronic device may select the pass stored on the electronic device for use in a transaction between the electronic device and the provider subsystem (e.g., at step 624 of process 600, a selection of a particular pass may be received or otherwise determined by device 100 (e.g., "Pass A" of pass data 119*a*)). At step 1104 of process 1100, the electronic device may obtain credential data associated with the selected pass from a secure element of the electronic device, wherein the credential data includes first data based on a primary account number ("PAN") stored in a first applet of the secure element, and second data based on an application identifier ("AID") stored in a second applet of the secure element (e.g., at step 626 of process 600 and/or at steps 706-714 of process 700, device 100 may obtain activated credential data from secure element 145 that is associated with the selected pass, such as PAN 159*a* of primary applet 153*a* and AID 155*b* of auxiliary applet 153*b* or such as PAN 159*c* of main applet 153*c* and AID 155*d* of proxy applet 153*d*). At step 1106 of process 1100, the electronic device may communicate the obtained credential data to the provider subsystem (e.g., at step 626 of process 600 and/or at step 716 of process 700, activated credential data may be communicated from device 100 to provider subsystem 200).

It is understood that the steps shown in process 1100 of FIG. 11 are only illustrative and that existing steps may be modified or omitted, additional steps may be added, and the order of certain steps may be altered.

When a credential of a secure element of device 100 is appropriately enabled (e.g., commerce credential data associated with an enabled applet 153*a* of credential SSD 154*a* of NFC component 120) so as to be provided as a commerce credential data communication to provider subsystem 200 (e.g., as a contactless proximity-based communication 5 to a provider terminal and/or as an online-based communication 672*o* to a provider server 210), acquiring bank subsystem 300 may utilize such a commerce credential data communication for completing a financial transaction with issuer subsystem 350. For example, after a user of electronic device 100 has chosen a product for purchase and has appropriately enabled a specific credential of device 100 to be used for payment, provider subsystem 200 may receive an appropriate commerce credential data communication indicative of commerce credential data for the specific credential. Provider server 210 and/or provider terminal 220 may be provided by any suitable provider or provider agent of provider subsystem 200 that may provide a product or service to a user of device 100 in response to device 100 providing payment credentials via such a commerce credential data communication. Based on such a received commerce credential data communication (e.g., communication 5/672*o*), provider subsystem 200 may be configured to generate and transmit data 678 to acquiring bank subsystem 300 (e.g., via a communication path 25 between provider subsystem 200 and acquiring bank subsystem 300), where data 678 may include payment information and an authorization request that may be indicative of the user's commerce credential and the provider's purchase price for the product or service. Also known as a payment processor or acquirer, acquiring bank subsystem 300 may be a banking partner of the provider associated with provider subsystem 200, and acquiring bank subsystem 300 may be configured to work with issuer subsystem 350 to approve and settle credential transactions attempted by electronic device 100 via a commerce credential data communication (e.g., via a contactless proximity-based communication 5 and/or via an online-based communication 672*o*) with provider subsystem 200. Acquiring bank subsystem 300 may then forward the authorization request from data 678 to issuer subsystem 350 as data 680 (e.g., via a communication path 35 between acquiring bank subsystem 300 and issuer subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. Issuer subsystem 350 may also include one or more acquiring banks, such as acquiring bank subsystem 300. For example, acquiring bank subsystem 300 may be the same entity as issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of payment network subsystem 360 and issuing bank subsystem 370 being separate entities, payment network subsystem 360 may receive the authorization request of data 680 from acquiring bank subsystem 300 and may then forward the request to issuing bank subsystem 370 (e.g., via a first communication path 45*a* between first payment network subsystem 360*a* and issuing bank subsystem 370 and/or via a second communication path 45*b* between second payment network subsystem 360*b* and issuing bank subsystem 370, while no communication path may be provided directly between first and second payment network subsystems 360*a* and 360*b*, as transaction entity subsystem 400 and/or issuing bank subsystem 370 may be operative to act as an intermediary between two different payment network subsystems (e.g., transaction entity subsystem 400 may be operative to communicate with two different payment network subsystems 360*a* and 360*b* independently for setting up the roles of each, for orchestrating the setting up of accounts, getting personalization data, getting keys, carving out space for credential instances of each on device 100, and the like during provisioning and other processes of system 1)). In the case of payment network subsystem 360 and issuing bank subsystem 370 being the same entity, acquiring bank subsystem 300 may submit the authorization request of data 680 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of issuer subsystem 350, payment network subsystem 360 may act as an aggregator for various issuing banks 370 and/or various acquiring banks 300. Issuer subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request as data 680 (e.g., directly from acquiring bank subsystem 300 or indirectly via payment network subsystem 360), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 684 (e.g., authorization response data 684 may be provided directly from issuing bank subsystem 370 to acquiring bank subsystem 300 via communication path 35, or authorization response data 684 may be provided from payment network subsystem 360 to acquiring bank subsystem 300 based on authorization response data that may be provided to a payment network subsystem 360 from issuing bank subsystem 370 via a communication path 45).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, wearable device, remote control, pager, computer (e.g., a desktop, laptop, tablet (e.g., an iPad™ available by Apple Inc.), server, etc.), monitor, television, stereo equipment, set up box, set-top box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OMMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as application 103, application 113a, application 113b, application 113c, and/or application 143. Each application 103/113a-113c/143 may include, but is not limited to, one or more operating system applications, firmware applications, media playback applications, media editing applications, communication applications, NFC applications, banking applications, loyalty applications, transit applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user or other entity via an output component 112 or other component of device 100. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and provider subsystem 200 (e.g., provider payment terminal 220). NFC component 120 may allow for close range communication at relatively low data rates (e.g., 424 kbps), and may comply with any suitable standards, such as ISO/IEC 7816, ISO/IEC 18092, ECMA-340 ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and provider subsystem 200 may occur within any suitable close range distance between device 100 and provider subsystem 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., provider terminal 220 of provider subsystem 200).

NFC component 120 may include any suitable modules for enabling contactless proximity-based communication between electronic device 100 and provider subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to provider subsystem 200 as part of a contactless proximity-based or NFC communication 5. Additionally or alternatively, NFC data module 132 may be configured to contain, route, or otherwise receive any suitable data that may be received by NFC component 120 from provider subsystem 200 as part of a contactless proximity-based communication 5.

NFC transceiver or NFC antenna 134 may be any suitable antenna or other suitable transceiver circuitry that may generally enable communication of communication from NFC data module 132 to provider subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication between NFC data module 132 of NFC device module 130 and another entity (e.g., provider subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication to subsystem 200. For example, shared antenna 116 may require amplification from booster 136 before antenna 116 (e.g., a non-loop antenna) may be properly enabled for communicating contactless proximity-based or NFC communication between electronic device 100 and provider subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating an NFC communication 5 between electronic device 100 and provider subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications 143, such as a routing application (e.g., implementing a routing table), an NFC low power mode, or a wallet application, that may help dictate the function of NFC component 120, where application 143 may or may not be accessed by NFC processor module 142 from memory module 150 or any other portion of device 100. Application 143 may include, but is not limited to, one or more operating system applications, firmware applications, NFC low power applications, or any other suitable applications that may be accessible to NFC component 120

(e.g., application 103/113). NFC controller module 140 may include one or more protocols, such as the Near Field Communication Interface and Protocols ("NFCIP-1"), for communicating with another NFC device (e.g., provider subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 5) from NFC tags (e.g., from provider subsystem 200) to NFC data module 132, a peer-to-peer mode for exchanging data (e.g., communication 5) with another NFC enabled device (e.g., provider subsystem 200), and a card emulation mode for allowing another NFC enabled device (e.g., provider subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., provider subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 113a/b/c and/or application 143).

NFC memory module 150 may operate in conjunction with NFC device module 130 and/or NFC controller module 140 to allow for NFC communication between electronic device 100 and provider subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applets and any suitable keys, etc.) in accordance with rules and security requirements that may be set forth by a set of well-identified trusted authorities (e.g., an authority of issuer subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing issuer (e.g., transaction entity subsystem 400 and/or issuer subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360a may be the TSM for first SSD 154a and applet 153a of first SSD 154a may be associated with a commerce credential managed by that first payment network subsystem 360a, while a second payment network subsystem 360b may be the TSM for second SSD 154b and applet 153b of second SSD 154b may be associated with a commerce credential managed by that second payment network subsystem 360b.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to provider subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

A provider terminal (e.g., provider terminal 200) of provider subsystem 200 of FIG. 1 may include a reader for detecting, reading, or otherwise receiving an NFC communication from electronic device 100 (e.g., when electronic device 100 comes within a certain distance or proximity of such a provider terminal). Accordingly, it is noted that an NFC communication between such a provider terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a provider terminal. For instance, a reader of such a provider terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to such a provider terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to such a provider terminal as an NFC communication, rather than reflect radio frequency signals, as in the case of a passive NFC device module 130. A provider terminal may be provided by a provider of provider subsystem 200 (e.g., in a store of the provider for selling products or services directly to the user of device 100 at the store).

While NFC component 120 has been described with respect to near field communication, it is to be understood that component 120 may be configured to provide any suitable contactless proximity-based mobile payment or any other suitable type of contactless proximity-based communication between electronic device 100 and provider subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113a and/or application 113b and/or application 113c and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Provider App" textual indicator 181 (i.e., specific icon 183) is selected, device 100 may launch or otherwise access a specific provider application and may display screens of a specific user interface that may include one or more tools or features for interacting with device 100 in a specific manner. For each application, screens may be displayed on display output component 112a and may include various user interface elements (e.g., screens 190a-190d of FIGS. 8A-8D). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-11 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of application 103 and/or application 113a and/or application 113b and/or application 113c and/or application 143 of device 100 and/or as an application of transaction entity subsystem 400 and/or as an application of provider subsystem 200 and/or as an application of issuer subsystem 350)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100 may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112*a*). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112*a*) with graphical data to display a graphical user interface ("GUI") 180. GUI 180 may be configured to receive touch input via a touch input component 110*f*. Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f* GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 11 of which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for provisioning multiple credentials of a multi-scheme payment card on an electronic device for selective use in a transaction (e.g., a secure transaction), it is to be understood that many changes may be made without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. An electronic device comprising:
a pass providing a digital representation of a multi-scheme card for a first credential and a second credential, wherein the pass is accessible via a card management application of the electronic device;
a secure element comprising:
a first applet comprising a first application identifier ("AID") and a first primary account number ("PAN") associated with the first credential; and
a second applet comprising a second AID associated with the second credential;
link information operative to associate the pass to the first applet and the second applet; and
at least one processor operative to:
select with the card management application the multi-scheme card of the pass for use in a transaction with a provider subsystem remote from the electronic device based at least in part on the link information;
obtain activated credential data from the secure element based on the selection; and
communicate the activated credential data to the provider subsystem, wherein the activated credential data comprises the first PAN and the second AID.

2. The electronic device of claim 1, wherein the link information is operative to instruct the at least one processor not to enable selection of a particular one of the first credential or the second credential of the multi-scheme card.

3. The electronic device of claim 2, wherein the at least one processor is operative to select the multi-scheme card responsive to a received instruction.

4. The electronic device of claim 2, wherein:
the second applet further comprises a second PAN associated with the second credential; and
the activated credential data further comprises the first AID and the second PAN.

5. The electronic device of claim 1, wherein the link information is operative to instruct the at least one processor to enable selection of one of the first credential or the second credential of the multi-scheme card.

6. The electronic device of claim 5, wherein the at least one processor is operative to select the multi-scheme card based at least in part on a received user instruction.

7. The electronic device of claim 1, wherein the at least one processor is operative to obtain the activated credential data based on the selection by:
determining, with the at least one processor, that the second applet is identified by the selection;
sending, with the at least one processor, processor command data to the second applet based on the determination; and
receiving, with the at least one processor, response data from the second applet comprising the first PAN and the second AID.

8. The electronic device of claim 7, wherein the second applet is operative to:
receive the processor command data from the at least one processor; and
fetch at least the first PAN from the first applet in response to receiving the processor command data.

9. A method for providing a multi-scheme card on an electronic device comprising a secure element, the method comprising:
at a transaction entity subsystem remote from the electronic device:
receiving, from the electronic device, credential provisioning request data comprising request primary account number ("PAN") information indicative of a request PAN associated with the multi-scheme card;
identifying a plurality of credentials associated with the request PAN information of the received credential provisioning request data;
acquiring, from an issuer subsystem, first credential provisioning information for a first credential of the identified plurality of credentials;
acquiring, from the issuer subsystem, second credential provisioning information for a second credential of the identified plurality of credentials; and
provisioning, on the electronic device, credential data based on the acquired first credential provisioning information and the acquired second credential provisioning information, wherein the provisioning comprises:
storing, on the secure element of the electronic device, a first applet comprising a first PAN and a first application identifier ("AID") associated with the first credential;
storing, on the secure element of the electronic device, a second applet comprising a second AID associated with the second credential; and
storing, on the electronic device, link information operative to associate the first applet with the second applet.

10. The method of claim 9, wherein:
the provisioning the credential data further comprises storing, on the electronic device, pass information associated with the request PAN of the multi-scheme card; and
the pass information is operative to be presented on a display of the electronic device.

11. The method of claim 10, wherein the pass information is operative to be presented for enabling, based on the link information, one of:
selection of one of the first credential or the second credential of the multi-scheme card to be used by the electronic device in a transaction; or
selection of the multi-scheme card to be used by the electronic device in a transaction.

12. The method of claim 9, wherein the storing the link information comprises storing at least a portion of the link information on the secure element.

13. The method of claim 9, wherein the storing the link information comprises storing at least a portion of the link information in a global registry of the secure element.

14. The method of claim 9, wherein:
the provisioning the credential data further comprises storing, on the electronic device, pass information associated with the request PAN of the multi-scheme card; and
the storing the link information comprises storing at least a portion of the link information in a file comprising the pass information.

15. The method of claim 9, wherein the stored second applet does not comprise a PAN.

16. A method for providing a multi-scheme card on an electronic device comprising a secure element, the method comprising:
at the electronic device:
transmitting, to a transaction entity subsystem remote from the electronic device, credential provisioning request data comprising request primary account number ("PAN") information indicative of a request PAN of the multi-scheme card;
receiving, from the transaction entity subsystem, credential data for a plurality of credentials associated with the request PAN information of the transmitted credential provisioning request data;
storing, on the secure element, a first applet comprising:
a first application identifier ("AID") of the credential data that is associated with a first credential of the plurality of credentials; and
a first PAN of the credential data;
storing, on the secure element, a second applet comprising a second AID of the credential data that is associated with a second credential of the plurality of credentials; and
storing, on the electronic device, link information of the credential data that associates the first applet with the second applet.

17. The method of claim 16, wherein the storing the link information comprises storing at least a portion of the link information in the second applet.

18. The method of claim 16, further comprising:
storing, on the electronic device, a pass providing a digital representation of the multi-scheme card; and
storing at least a portion of the link information in a file of the pass.

19. The method of claim 16, further comprising, at the electronic device:
storing pass data that provides a digital representation of the multi-scheme card accessible via a card management application of the electronic device;
selecting with the card management application the multi-scheme card of the stored pass for use in a transaction with a provider subsystem based at least in part on the stored link information;
obtaining activated credential data from the secure element based at least in part on the selecting the multi-scheme card; and
communicating the activated credential data to the provider subsystem, wherein the activated credential data comprises the first PAN and the second AID.

20. The method of claim 19, wherein the obtaining comprises:
determining, with a processor of the electronic device, that the second applet is identified by the selection;
sending processor command data from the processor to the second applet based on the determination;
receiving, at the second applet, the processor command data;
fetching, at the second applet, at least the first PAN from the first applet in response to receiving the processor command data; and
receiving, with the processor, response data from the second applet comprising the fetched first PAN and the second AID.

* * * * *